(12) United States Patent  (10) Patent No.: US 8,023,606 B2
Ozawa  (45) Date of Patent: *Sep. 20, 2011

(54) CLOCK DATA RESTORATION DEVICE

(75) Inventor: Seiichi Ozawa, Wako (JP)

(73) Assignee: Thine Electronics, Inc., Tokyo (JP)

( * ) Notice: Subject to any disclaimer, the term of this patent is extended or adjusted under 35 U.S.C. 154(b) by 422 days.

This patent is subject to a terminal disclaimer.

(21) Appl. No.: 12/094,058

(22) PCT Filed: Nov. 16, 2006

(86) PCT No.: PCT/JP2006/322894
§ 371 (c)(1),
(2), (4) Date: Jan. 7, 2009

(87) PCT Pub. No.: WO2007/058279
PCT Pub. Date: May 24, 2007

(65) Prior Publication Data
US 2009/0225916 A1  Sep. 10, 2009

(30) Foreign Application Priority Data

Nov. 17, 2005  (JP) ................................ P2005-332945

(51) Int. Cl.
*H04L 7/00* (2006.01)
(52) U.S. Cl. ........ 375/355; 375/356; 375/360; 375/373; 375/375; 375/376
(58) Field of Classification Search .................. 375/355, 375/356, 360, 373, 375, 376
See application file for complete search history.

(56) References Cited

U.S. PATENT DOCUMENTS

| 2004/0051571 | A1 | 3/2004 | Okamura | |
|---|---|---|---|---|
| 2005/0084048 | A1* | 4/2005 | Wu | 375/355 |
| 2006/0034394 | A1* | 2/2006 | Popescu et al. | 375/326 |
| 2006/0055472 | A1* | 3/2006 | Bietti et al. | 331/57 |
| 2006/0062341 | A1* | 3/2006 | Edmondson et al. | 375/376 |

FOREIGN PATENT DOCUMENTS

| JP | 7221800 | 8/1995 |
|---|---|---|
| JP | 2004507963 | 3/2004 |
| JP | 2004254324 | 9/2004 |
| WO | 0219528 A2 | 3/2002 |

* cited by examiner

*Primary Examiner* — Kabir A Timory
(74) *Attorney, Agent, or Firm* — Sughrue Mion, PLLC

(57) ABSTRACT

With the clock data restoration device 1, as a result of the processing of a loop which comprises the sampler section 10, detection section 20, timing determination section 30, and clock output section 40, the respective phases of the clock signal CKXA, clock signal CKXB, and clock signal CK are adjusted to match the phase of the input digital signal, the digital signal sampling time indicated by the clock signal CKXA is adjusted to match the peak time of the distribution of data transition times in a case where the value D (n−2) and value D(n−1) of the preceding two bits differ from one another, and the digital signal sampling time indicated by the clock signal CKXB is adjusted to match the peak time of the distribution of data transition times in a case where the value D (n−2) and value D(n−1) of the preceding two bits are equal to one another.

20 Claims, 24 Drawing Sheets

| D(n-1) | DXA(n) | D(n) | UPA | DNA |
|---|---|---|---|---|
| 0 | 0 | 0 | 0 | 0 |
| 0 | 0 | 1 | 0 | 1 |
| 0 | 1 | 0 | 0 | 0 |
| 0 | 1 | 1 | 1 | 0 |
| 1 | 0 | 0 | 1 | 0 |
| 1 | 0 | 1 | 0 | 0 |
| 1 | 1 | 0 | 0 | 1 |
| 1 | 1 | 1 | 0 | 0 |

(b)

| D(n-1) | DXB(n) | D(n) | UPB | DNB |
|---|---|---|---|---|
| 0 | 0 | 0 | 0 | 0 |
| 0 | 0 | 1 | 0 | 1 |
| 0 | 1 | 0 | 0 | 0 |
| 0 | 1 | 1 | 1 | 0 |
| 1 | 0 | 0 | 1 | 0 |
| 1 | 0 | 1 | 0 | 0 |
| 1 | 1 | 0 | 0 | 1 |
| 1 | 1 | 1 | 0 | 0 |

| D(n-1) | DX(n) | D(n) | UP | DN |
|--------|-------|------|----|----|
| 0 | 0 | 0 | 0 | 0 |
| 0 | 0 | 1 | 0 | 1 |
| 0 | 1 | 0 | 0 | 0 |
| 0 | 1 | 1 | 1 | 0 |
| 1 | 0 | 0 | 1 | 0 |
| 1 | 0 | 1 | 0 | 0 |
| 1 | 1 | 0 | 0 | 1 |
| 1 | 1 | 1 | 0 | 0 |

CLOCK DATA RESTORATION DEVICE

TECHNICAL FIELD

The present invention relates to a device for restoring a clock signal and data on the basis of a digital signal which is input.

BACKGROUND ART

The waveform of a digital signal that is output by a transmitter deteriorates while being transmitted from the transmitter to the receiver via a transmission path and a clock signal and data must be restored on the receiver side. The clock data restoration device for performing such restoration is disclosed in Patent Documents 1 and 2, for example.

The device disclosed in these Patent Documents 1 and 2 considers the fact that the time when the data in the digital signal whose waveform deteriorates make the transition changes and detects the data of the respective bits with three timings. Here, among the three timings when detecting the data of the respective bits, the first timing is set close to the start time of the data stability period of the bits, the second timing is set close to the end time of the data stability period of the bits, and a third timing is set at a middle time between the first and second timings.

Further, the device disclosed in Patent Document 1 restores the clock signal by adjusting the respective timings so that all the data detected at the three timings for the respective bits match and, at this time, restores the data by detecting the data of the respective bits at the middle third timing.

However, the device disclosed in Patent Document 2 restores the clock signal by adjusting the respective timings so that the bit error rates at the first timing and second timing respectively (that is, the rate at which the data detected at each of these timings differs from the data detected at the middle third timing) are equal to one another and lie within the start set range and restores data by detecting the data of the respective bits at the middle third timing.

[Patent Document 1] Japanese Application Laid Open No. H7-221800

[Patent Document 2] Japanese Published Patent Application, Japanese Translation of PCT international application No. 2004-507963

DISCLOSURE OF THE INVENTION

Problem to be Solved by the Invention

Further, the data transition time of the input digital signal changes due to the transmitter clock jitter arising from power source voltage fluctuations of the transmitter sending the digital signal or other noise and changes due to intersymbol interference arising from the mixing of an irregular data pattern in the digital signal and the attenuation in the transmission path. In cases where transmitter clock jitter and intersymbol interference are large, the conventional device is sometimes unable to restore the clock signal and data.

The present invention was conceived in view of solving the above problem and an object of the present invention is to provide a clock data restoration device which is able to restore a clock signal and data stably even when the transmitter clock jitter and intersymbol interference are large.

Means for Solving the Problem

The clock data restoration device according to a first invention is a clock data restoration device which restores a clock signal and data on the basis of an input digital signal and comprises a sampler section, a detection section, a timing determination section, and a clock output section.

The sampler section according to the first invention receives an input of a clock signal CKXA, a clock signal CKXB, and a clock signal CK which have the same cycle T as well as an input of the digital signal and samples, holds, and outputs, in each nth period T(n) of the cycle, a value DXA(n) of the digital signal at a time $t_{XA}$ indicated by the clock signal CKXA, a value DXB(n) of the digital signal at a time $t_{XB}$ indicated by the clock signal CKXB, and a value D(n) of the digital signal at a time $t_C$ indicated by the clock signal CK, where $t_{XA} < t_{XB} < t_C$ and n is an integer.

The detection section of the first invention (1) receives an input of the digital value DXA(n), digital value DXB(n), and digital value D(n) which are output by the sampler section in each period T(n) and, (2) in a case where 'D(n−2)≠D(n−1)', detects a timing relation (called the 'first timing relation' hereinbelow) between a time indicated by the clock signal CKXA and the transition time of the digital signal value on the basis of a value D(n−1), the value DXA(n), and the value D(n) and, (3) in a case where 'D(n−2)=D(n−1)', detects a timing relation (called the 'second timing relation' hereinbelow) between the time indicated by the clock signal CKXB and the transition time of the digital signal value on the basis of value D(n−1), value DXB(n), and value D(n), and (4) detects the phase relation between the clock signal CK and the digital signal on the basis of the first timing relation and the second timing relation.

The timing determination section of the first invention determines, on the basis of the first timing relation and the second timing relation detected by the detection section, an interval 2τ between the respective timings of the clock signal CKXA and the clock signal CKXB so that the time indicated by the clock signal CKXA is the center of the transition time distribution of the digital signal value in a case where 'D(n−2)≠D(n−1)' so that the time indicated by the clock signal CKXB is the center of the transition time distribution of the digital signal value in a case where 'D(n−2)=D(n−1)'.

The clock output section of the first invention adjusts cycle T or the phase on the basis of the phase relation detected by the detection section so that the phase difference between the clock signal CK and the digital signal decreases and outputs the clock signal CKXA, the clock signal CKXB, and the clock signal CK which satisfy the relations '$t_{XA} = t_C - T/2 - \tau$' and '$t_{XB} = t_C - T/2 + \tau$' to the sampler section in accordance with the timings determined by the timing determination section.

In the clock data restoration device according to the first invention which is constituted in this manner, the respective phases of the clock signal CKXA, clock signal CKXB, and clock signal CK are adjusted to match the phase of the input digital signal by means of the processing of a loop which comprises the sampler section, detection section, timing determination section, and clock output section. In addition, as a result of the loop processing, the digital signal sampling time indicated by the clock signal CKXA is adjusted to match the peak time of the distribution of data transition times in a case where the value D(n−2) and value D(n−1) of the preceding two bits differ from one another and the digital signal sampling time indicated by the clock signal CKXB is adjusted to match the peak time of the distribution of data transition times in a case where the value D(n−2) and value D(n−1) of the preceding two bits are equal to one another. Furthermore, any of the clock signal CKXA, clock signal CKXB, and clock signal CK is output as the restored clock. Chronological order data for digital value D(n) are also output as the restored data.

The detection section according to the first invention preferably comprises (1) a first timing relation detection circuit which, in cases where 'D(n−2)≠D(n−1)', outputs a UPA signal which is a significant value when 'D(n−1)≠DXA(n)=D(n)' and a DNA signal which is a significant value when 'D(n−1)=DXA(n)≠D(n)' as signals which represent the first timing relation; (2) a second timing relation detection circuit which, in cases where 'D(n−2)=D(n−1)', outputs a UPB signal which is a significant value when 'D(n−1)≠DXB(n)=D(n)' and a DNB signal which is a significant value when 'D(n−1)=DXB(n)≠D(n)' as signals which represent the second timing relation; and (3) a phase relation detection circuit which outputs a UP signal which represents the logical OR of the UPA signal and the UPB signal and a DN signal which represents the logical OR of the DNA signal and the DNB signal as signals which represent the phase relation.

The timing determination section according to the first invention preferably determines each of the timings of the clock signal CKXA, the clock signal CKXB, and the clock signal CK so that the difference between the ratio between a cumulative addition value cntINSIDE of 'DNA+UPB' and a cumulative addition value cntEDGE of 'UPA+UPB+DNA+DNB' (cntINSIDE/cntEDGE) and the value 0.5 is equal to or less than a predetermined reference value.

The clock output section according to the first invention preferably comprises (1) a reference clock generation circuit which generates a reference clock signal obtained by adjusting cycle T or phase on the basis of the UP signal and the DN signal; and (2) a delay circuit which applies the desired delay to the reference clock signal in accordance with the timing determined by the timing determination section, generates the clock signal CKXA, the clock signal CKXB, and the clock signal CK, and outputs these signals.

The clock data restoration device according to a second invention is a clock data restoration device which restores a clock signal and data on the basis of an input digital signal comprises a sampler section, a detection section, an offset determination section, and a clock output section.

The sampler section of the second invention receives an input of a clock signal CKX and a clock signal CK which have the same cycle T as well as an input of the digital signal, generates a first signal by applying an offset (−Voff) to the digital signal, generates a second signal by applying an offset (+Voff) to the digital signal, and which samples, holds, and outputs, in each nth period T(n) of the cycle, a value DXA(n) of the first signal and a value DXB(n) of the second signal at a time $t_X$ indicated by the clock signal CKX, and a value D(n) of the digital signal at a time $t_C$ indicated by the clock signal CK. Alternatively, the sampler section receives an input of a clock signal CKX and a clock signal CK which have the same cycle T as well as an input of the digital signal, which, in each nth period T(n) of the cycle, samples and holds the value of the digital signal at time $t_X$ indicated by the clock signal CKX at a threshold value which is offset by +Voff and −Voff and outputs this value as DXA(n) and DXB(n) respectively, and samples, holds, and outputs the value D(n) of the digital signal at a time $t_C$ indicated by the clock signal CK (where '$t_X < t_C$', and n is an integer).

The detection section of the second invention (1) receives an input of the digital value DXA(n), the digital value DXB(n), and the digital value D(n) which are output by the sampler section in each period T(n) and, (2) in a case where value D(n−2) is at a high level, detects a timing relation (called the 'first timing relation' hereinbelow) between the time indicated by the clock signal CKX and the transition time of the value of the first signal on the basis of a value D(n−1), value DXA(n), and value D(n) and, (3) in a case where value D(n−2) is at a low level, detects a timing relation (called the 'second timing relation' hereinbelow) between the time indicated by the clock signal CKX and the transition time of the value of the second signal on the basis of the value D(n−1), value DXB(n), and value D(n) and (4) detects a phase relation between the clock signal CK and the digital signal on the basis of the first timing relation and the second timing relation.

The offset determination section of the second invention determines, on the basis of the first timing relation and the second timing relation detected by the detection section, an offset amount of the sampler section so that the time indicated by the clock signal CKX is the center of the transition time distribution of the value of the first signal in a case where the value D(n−2) is at a high level and so that the time indicated by the clock signal CKX is the center of the transition time distribution of the value of the second signal in a case where value D(n−2) is a low level.

The clock output section of the second invention adjusts cycle T or the phase on the basis of the phase relation detected by the detection section so that the phase difference between the clock signal CK and the digital signal decreases and outputs the clock signal CKX and the clock signal CK which satisfy the relation '$t_C − t_X = T/2$' to the sampler section.

The clock data restoration device according to the second invention constituted in this manner comprises a first loop which comprises a sampler section, a detection section, and a clock output section and a second loop which comprises a sampler section, a detection section, and an offset determination section. As a result of the processing of these two loops, the respective phases of the clock signal CKX and clock signal CK are adjusted to match the phase of the input digital signal, the sampling time indicated by the clock signal CKX is adjusted to match the peak time of the distribution of the data transition times of a first signal in a case where value D(n−2) is at a high level, and the sampling time indicated by the clock signal CKX is adjusted to match the peak time of the distribution of data transition times of a second signal in a case where value D(n−2) is at a low level. Further, either the clock signal CKX or clock signal CK is output as the restored clock signal. In addition, chronological data of digital value D(n) are output as the restored data.

The detection section of the second invention preferably comprises (1) a first timing relation detection circuit which, in cases where value D(n−2) is at a high level, outputs a UPA signal which is a significant value when 'D(n−1)≠DXA(n)=D(n)' and a DNA signal which is a significant value when 'D(n−1)=DXA(n)≠D(n)' as signals which represent the first timing relation; (2) a second timing relation detection circuit which, in cases where value D(n−2) is at a low level, outputs a UPB signal which is a significant value when 'D(n−1)≠DXB(n)=D(n)' and a DNB signal which is a significant value when 'D(n−1)=DXB(n)≠D(n)' as signals which represent the second timing relation; and (3) a phase relation detection circuit which outputs a UP signal which represents the logical OR of the UPA signal and the UPB signal and a DN signal which represents the logical OR of the DNA signal and the DNB signal as signals which represent the phase relation.

The offset determination section of the second invention preferably determines the offset amount of the sampler section so that the difference between the ratio of a cumulative addition value cntINSIDE of 'D(n)(DNA+UPB)+D(n)(UPA+DNB) and a cumulative addition value cntEDGE of 'UPA+UPB+DNA+DNB' (cntINSIDE/cntEDGE) and the value 0.5 is equal to or less than a predetermined reference value.

The clock output section of the second invention preferably adjusts cycle T or the phase on the basis of the UP signal and the DN signal and outputs the clock signal CKX and the clock signal CK.

The clock data restoration device according to a third invention is a clock data restoration device which restores a clock signal and data on the basis of an input digital signal, comprising a sampler section, a detection section, an offset determination section, and a clock output section.

The sampler section of the third invention receives an input of a clock signal CKX and a clock signal CK which have the same cycle T as well as an input of the digital signal, generates a first signal by applying an offset (−Voff) to the digital signal, generates a second signal by applying an offset (+Voff) to the digital signal, and which samples, holds, and outputs, in each nth period T(n) of the cycle, a value DXA(n) of the first signal and a value DXB(n) of the second signal at a time $t_X$ indicated by the clock signal CKX, and a value D(n) of the digital signal at a time $t_C$ indicated by the clock signal CK. Alternatively, the sampler section receives an input of a clock signal CKX and a clock signal CK which have the same cycle T as well as an input of the digital signal, which, in each nth period T(n) of the cycle, samples and holds the value of the digital signal at time $t_X$ indicated by the clock signal CKX at a threshold value which is offset by +Voff and −Voff and outputs this value as DXA(n) and DXB(n) respectively, and samples, holds, and outputs the value D(n) of the digital signal at a time $t_C$ indicated by the clock signal CK, where '$t_X<t_C$' and n is an integer.

In each period T(n), the detection section according to the third invention (1) receives an input of the digital value DXA(n), the digital value DXB(n), and the digital value D(n) which are output by the sampler section, (2) establishes 'DX(n)=DXA(n)' when value D(n−2) is at a high level and (3) establishes 'DX(n)=DXB(n)' when value D(n−2) is at a low level, and (4) detects the phase relation between the clock signal CK and digital signal on the basis of value D(n−1), value DX(n), and value D(n).

The offset determination section according to the third invention determines, on the basis of value DX(n), value D(n−2), value D(n−1), and value D(n), an offset amount of the sampler section so that the time indicated by the clock signal CKX is the center of the transition time distribution of the value of the first signal in a case where the value D(n−2) is at a high level and so that the time indicated by the clock signal CKX is the center of the transition time distribution of the value of the second signal in a case where value D(n−2) is at a low level.

The clock output section of the third invention adjusts cycle T or the phase on the basis of the phase relation detected by the detection section so that the phase difference between the clock signal CK and the digital signal decreases and outputs the clock signal CKX and the clock signal CK which satisfy the relation '$t_C-t_X=T/2$' to the sampler section.

The clock data restoration device according to the third invention constituted in this manner comprises a first loop which comprises a sampler section, a detection section, and a clock output section and a second loop which comprises a sampler section, a detection section, and an offset determination section. As a result of the processing of these two loops, the respective phases of the clock signal CKX and clock signal CK are adjusted to match the phase of the input digital signal, the sampling time indicated by the clock signal CKX is adjusted to match the peak time of the distribution of the data transition times of a first signal in a case where value D(n−2) is at a high level, and the sampling time indicated by the clock signal CKX is adjusted to match the peak time of the distribution of data transition times of a second signal in a case where value D(n−2) is at a low level. Further, either the clock signal CKX or clock signal CK is output as the restored clock signal. In addition, chronological data of digital value D(n) are output as the restored data.

The detection section of the third invention preferably comprises (1) a selection circuit which outputs value DXA(n) as value DX(n) when value D(n−2) is at a high level and outputs value DXB(n) as value DX(n) when value D(n−2) is at a low level; and (2) a phase relation detection circuit which outputs a UP signal which is a significant value when 'D(n−1)≠DX(n)=D(n)' and a DN signal which is a significant value when 'D(n−1)=DX(n)≠D(n)' as signals which represent the phase relation.

The offset determination section of the third invention preferably determines the offset amount of the sampler section so that the difference between the ratio between a cumulative addition value cntINSIDE of '{D(n)^D(n−1)}*{D(n−2)^DX(n)}' and a cumulative addition value cntEDGE of 'D(n)^D(n−1)'(cntINSIDE/cntEDGE) and the value 0.5 is equal to or less than a predetermined reference value.

The clock output section of the third invention preferably adjusts cycle T or the phase on the basis of the UP signal and the DN signal and outputs the clock signal CKX and the clock signal CK.

Effects of the Invention

The present invention makes is possible to restore a clock signal and data stably even in cases where the transmitter clock jitter and intersymbol interference are large.

BRIEF DESCRIPTION OF THE DRAWINGS

FIG. 7 shows truth tables for I/O values of phase comparison circuits 22a and 23a which are contained in the timing relation detection circuits 22 and 23.

FIG. 23 shows truth tables for I/O values of a phase relation detection circuit 68 which is contained in the detection section 60A.

Figure 1:
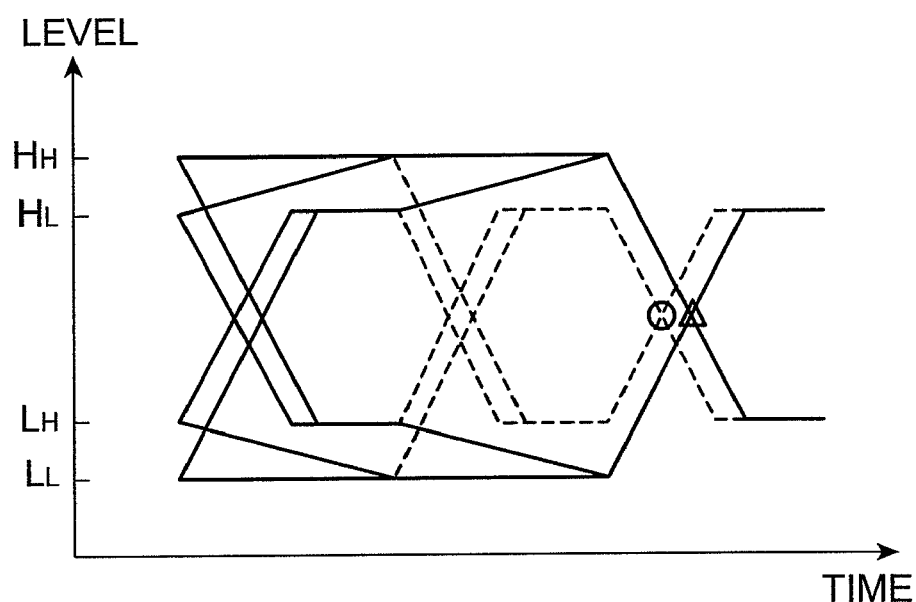
FIG. 1 schematically shows an eye pattern of a digital signal whose waveform has deteriorated.

| List of Elements | |
|---|---|
| 1, 2 | clock data restoration device |
| 10 | sampler section |
| 11 to 13 | latch circuit |
| 20 | detection section |
| 21 | resistor circuit |
| 22A, 22B | timing relation detection circuit |
| 23 | phase relation detection circuit |
| 30 | timing determination section |
| 40 | clock output section |
| 41 | reference clock generation circuit |
| 42 | delay circuit |
| 50 | sampler section |
| 51 to 53 | latch circuit |
| 54, 55 | addition circuit |
| 60, 60A | detection section |
| 61 | register circuit |
| 62A, 62B | timing relation detection circuit |
| 63 | phase relation detection circuit |
| 66 | register circuit |
| 67 | selection circuit |
| 68 | phase relation detection circuit |
| 70, 70A | offset determination section |
| 80 | clock output section |
| 90 | DA conversion section |

BEST MODE FOR CARRYING OUT THE INVENTION

The best modes of carrying out the present invention will be described in detail hereinbelow with reference to the attached drawings. The same reference numerals are assigned to the same elements in the description of the drawings and repetitive descriptions are avoided.

The present invention was conceived by considering the pattern effect which arises in a digital signal whose waveform has deteriorated. Therefore, the pattern effect will be described first. FIG. 1 schematically shows an eye pattern for a digital signal whose waveform has deteriorated. The horizontal axis in FIG. 1 represents time while the vertical axis represents the voltage level. As shown in FIG. 1, when a digital signal whose waveform has deteriorated is analyzed, the time when data transition from a certain bit to the next bit depends on the pattern of the data before that time. In other words, the data transition time following a succession of the same data is relatively late (bold lines in FIG. 1) and, in contrast, the data transition time after the data have changed is relatively early (broken lines in FIG. 1).

The level of a certain bit depends on the code of the preceding bit. In other words, even when the bits are at the same level, the certain bit is at a high high level if the preceding bit is at a high level and the certain bit is at a low high level if the preceding bit is at a low level. The low levels are the same. The next transition of the certain bit depends on the level of this bit.

In cases where a bit transitions from a high high level ($H_H$) to a low level (L), because the bit transitions further than in a case where a bit transitions from a low high level ($H_L$) to a low level (L), the transition time is late. In cases where a bit transitions from a low low level ($L_L$) to a high level (H), because the bit transitions further than in a case where the bit transitions from a high low level ($L_H$) to a high level (H), the transition time is late. The high high level ($H_H$) and the low low level ($L_L$) appear in cases where the same level succeeds the preceding two bits. Therefore, the transition time following the succession of bits of the same level is said to be relatively late.

When considered from a different viewpoint, a case where a bit transitions from a high high level ($H_H$) to a low level (L) has a higher waveform at the low level than a case where a bit transitions from a low high level ($H_L$) to a low level (L). A case where a bit transitions from a high low level ($L_H$) to a high level (H) has a lower waveform at the high level than a case where a bit transitions from a low low level ($L_L$) to a high level (H).

The high high level ($H_H$) and high low level ($L_H$) appear in cases where the preceding bit is at a high level. Therefore, the offset of the subsequent transition waveform changes depending on the level of the preceding bit. This phenomenon is known as the pattern effect. Changes in the data transition time depend on the pattern of the data of preceding bits but depend largely on the difference between the respective data of the preceding two bits in particular. Furthermore, the data transition waveform depends on the preceding bits and possesses an offset.

Figure 2:
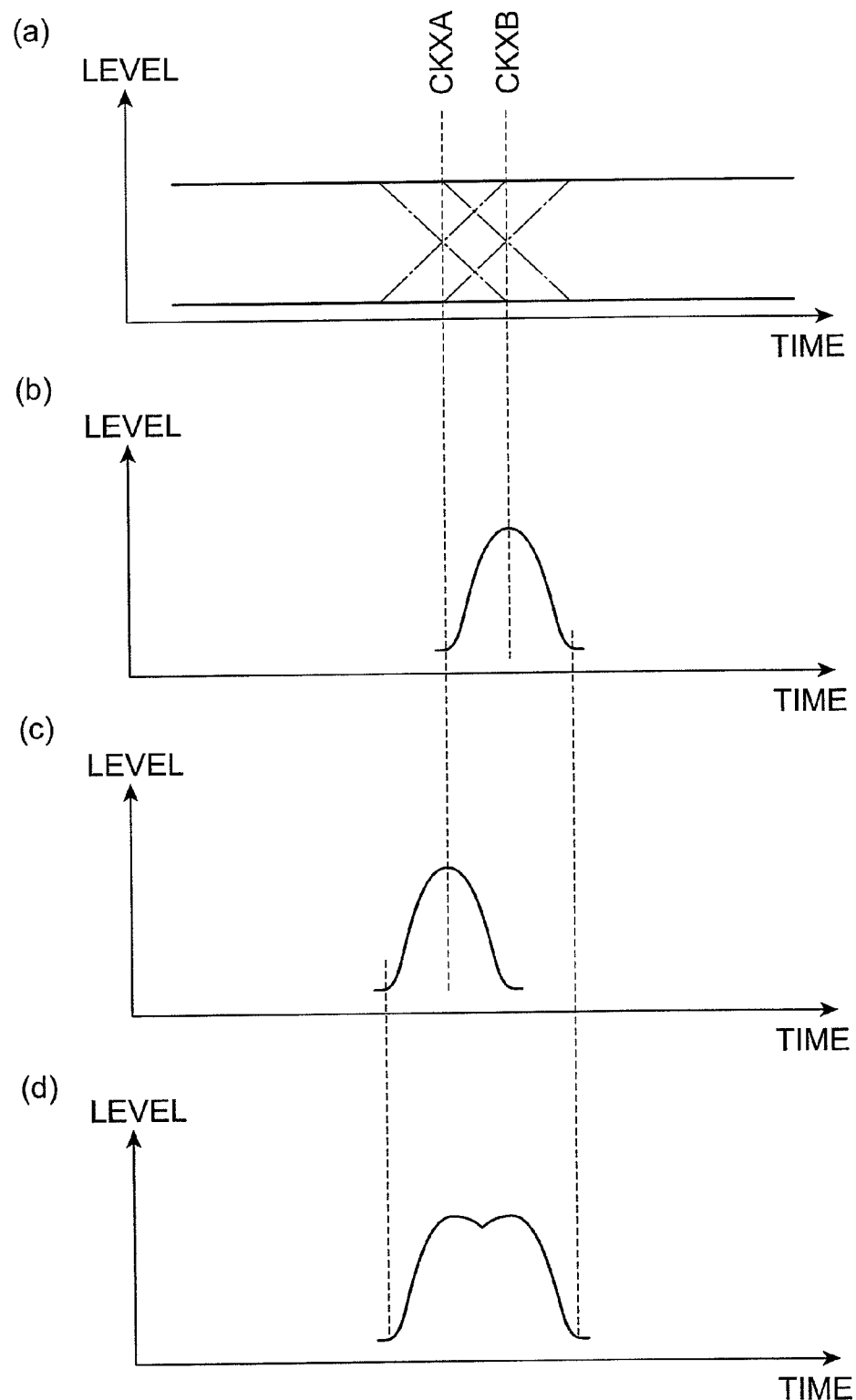
FIG. 2 illustrates the timing for sampling data of a data transition time.

After considering this pattern effect, the present invention performs detection by classifying between data transition times in cases where the respective data of the preceding two bits are different from one another and data transition times in cases where the respective data of the preceding two bits are equal to one another. FIG. 2 illustrates the timing for sampling the data of the data transition time.

(a) of FIG. 2 schematically shows an eye pattern of a digital signal.

(c) of FIG. 2 shows the distribution of data transition times in cases where the respective data of the preceding two bits are different from one another (clock signal CKXA) and (b) of FIG. 2 shows the distribution of data transition times in cases where the respective data of the preceding two bits are equal to one another (clock signal CKXB), and the timing for sampling the data of the data transition times of the present invention. Additionally, (d) of FIG. 2 shows, for the sake of a comparison, the distribution of a data transition time when the difference between the respective data of the preceding two bits is not distinguished, and the timing for sampling data of the data transition time of the invention which is disclosed by Patent Document 2.

As shown in (d) of FIG. 2, according to the invention disclosed by Patent Document 2, data of the digital signal are sampled at timings close to the both ends of the distribution of data transition times when the difference of the respective data of the preceding two bits are not distinguished. In contrast, as shown in (a) of FIG. 2, (b) of FIG. 2, and (c) of FIG. 2, the present invention samples the data of the respective digital signals at each of the timing of the peak of the distribution of data transition times in cases where the respective data of the preceding two bits are different from one another and the timing of the peak of the distribution of data transition times in a case where the respective data of the preceding two bits are equal to one another.

The first embodiment and second embodiment of the clock data restoration device according to the present invention will be described hereinbelow. According to the first embodiment, the timing of the peak of the distribution of data transition times in a case where the respective data of the preceding two bits are different from one another is indicated by clock signal CKXA and the timing of the peak of the distribution of data transition times in cases where the respective data of the preceding two bits are equal to one another is indicated by clock signal CKXB. According to the second embodiment, the equivalent relationship between the timing adjustment and offset amount adjustment is utilized to adjust the offset amount Voff so that the timing of the peak of the distribution of data transition times is indicated by one clock signal CKX for each of a first signal obtained by adding an offset voltage value (−Voff) to an input digital signal and a second signal obtained by adding an offset voltage value (+Voff) to an input digital signal.

First Embodiment

Figure 3:
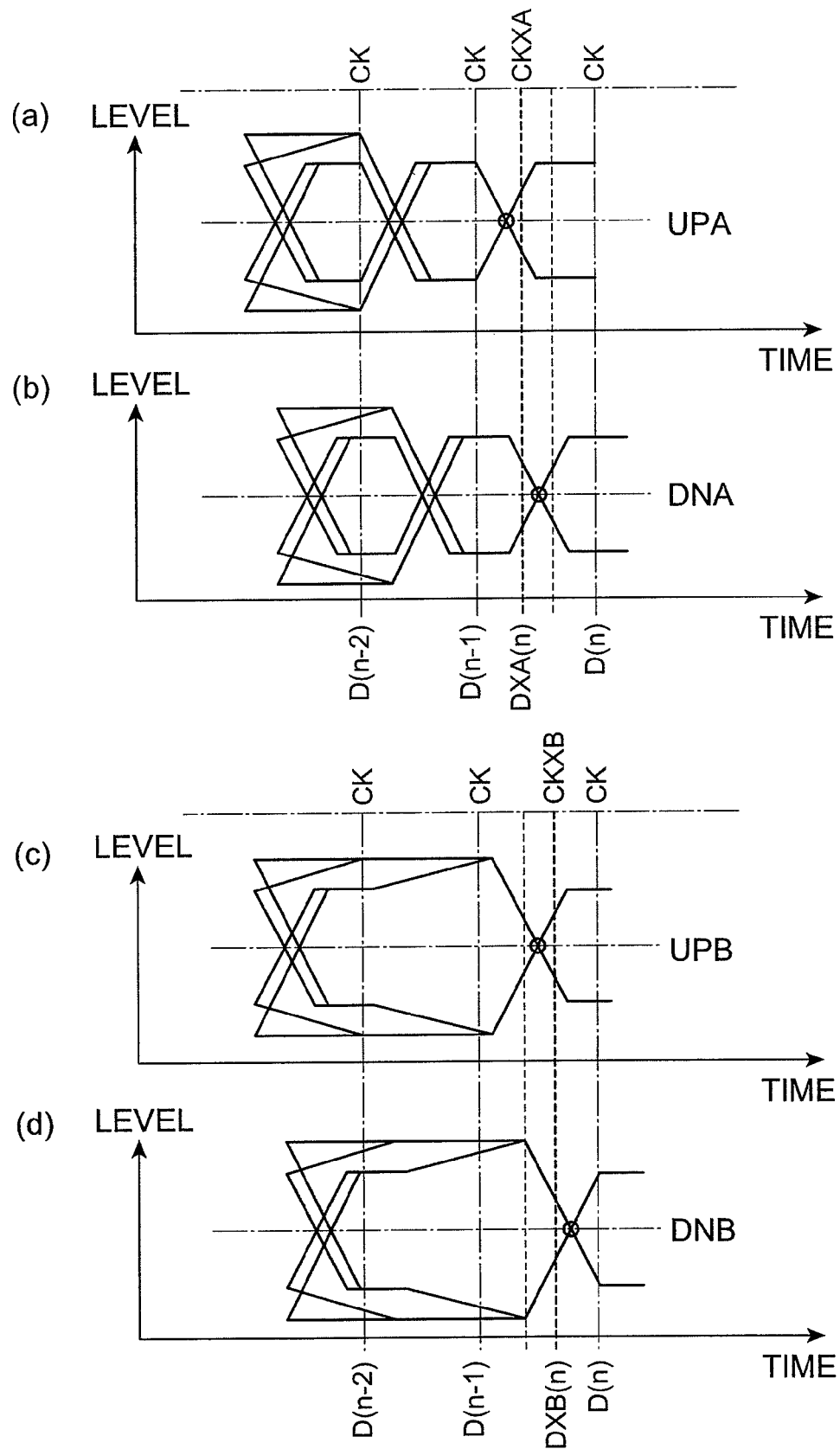
FIG. 3 shows the timing for sampling digital signal data according to the first embodiment.

First, the first embodiment of the clock data restoration device according to the present invention will be described. FIG. 3 shows the timing for sampling digital signal data according to the first embodiment. As shown by (a) of FIG. 3 and (b) of FIG. 3, in cases where the respective data of the preceding two bits are different from one another, value DXA of the digital signal is sampled with the timing indicated by clock signal CKXA. As shown by (c) of FIG. 3 and (d) of FIG. 3, in cases where the respective data of the preceding two bits are equal to one another, value DXB of the digital signal is sampled with the timing indicated by clock signal CKXB. In addition, a value D of the digital signal is sampled with the timing indicated by clock signal CK in the data stability period.

Further, in cases where the respective data of the preceding two bits are different from one another as per (a) of FIG. 3 and (b) of FIG. 3, a UPA signal and DNA signal which represent the timing relation between the timing of the peak of the distribution of data transition times and the timing indicated by clock signal CKXA are obtained on the basis of value DXA and value D so that the two timings match one another. In addition, as per (c) of FIG. 3 and (d) of FIG. 3, in cases where the respective data of the preceding two bits are equal to one another, the UPS signal and DNB signal which represent the timing relation between the timing of the peak of the distribution of data transition times and the timing indicated by clock signal CKXB are obtained on the basis of value DXB and value D so that the two timings match one another.

Figure 4:
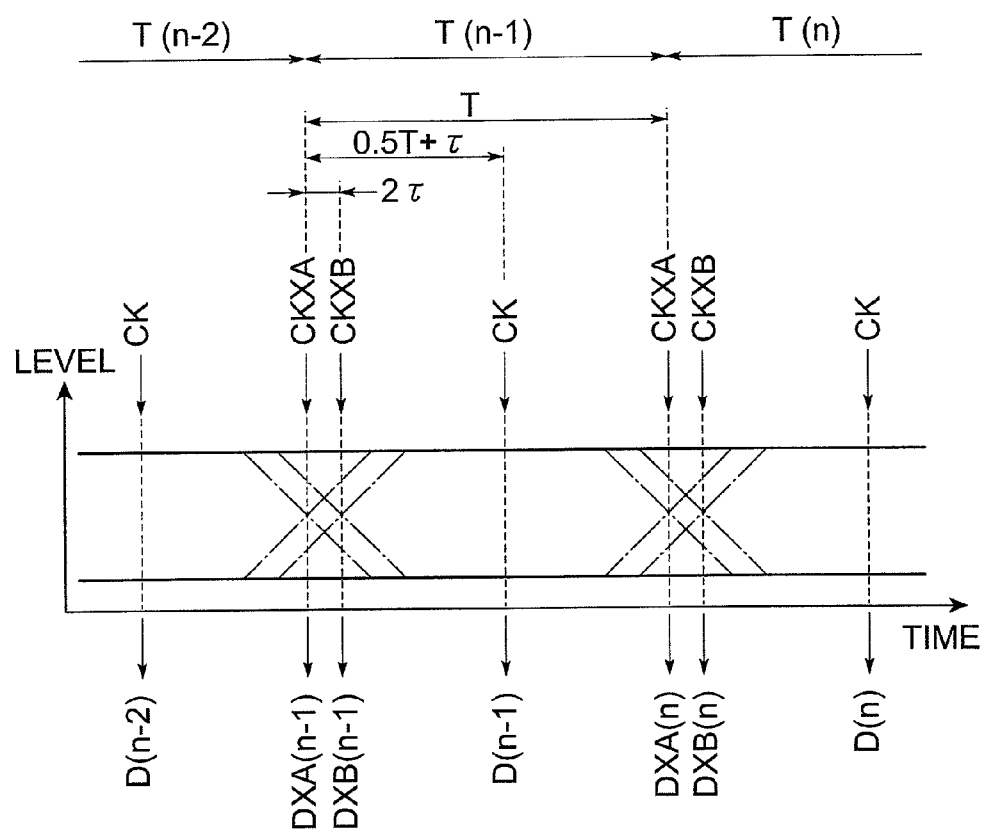
FIG. 4 illustrates the timing for sampling digital signal data of a clock data restoration device 1 according to the first embodiment.

As described hereinabove, the clock data restoration device 1 according to the first embodiment indicates the timing for sampling digital signal data by means of three clock signals CKXA, CKXB, and CK. FIG. 4 illustrates the timing for sampling digital signal data of the clock data restoration device 1 according to the first embodiment. FIG. 4 schematically shows an eye pattern of a digital signal and indicates the timing of the data sampling by means of CKXA, CKXB, and CK.

Three clock signals CKXA, CKXB, and CK have the same cycle T. The sampling time $t_{XB}$ indicated by clock signal CKXB lags the sampling time $t_{XA}$ indicated by clock signal CKXA by two hours $2\tau$ and the sampling time $t_C$ indicated by clock signal CK lags by the time $(T/2+\tau)$. In other words, the relations $t_{XA}<t_{XB}<t_C$, $t_{XA}=t_C-T/2-\tau$ and $t_{XB}=t_C-T/2+\tau$ are established, where cycle T and time $\tau$ are adjusted by the clock data restoration device 1.

In addition, as shown in FIG. 4, in each of the nth period T(n) of cycle T, the sampling time indicated by three clock signals CKXA, CKXB, and CK stand, in the order of clock signal CKXA, followed by clock signal CKXB, and clock signal CK, in each nth period T(n) of cycle T. n is an optional integer. Furthermore, the digital signal value which is sampled at the time indicated by the clock signal CKXA in each period T(n) denotes DXA (n) and the digital signal value which is sampled at the time indicated by clock signal CKXB in each period T(n) is denoted DXB (n) and the digital signal value which is sampled at the time indicated by clock signal CK in each period T(n) is denoted D(n).

Each of the three clock signals CKXA, CKXB, and CK may be single phase clock signals or multiphase clock signals. For example, when a case where a clock signal has four phases is considered, four clock signals CK<1>, CK<2>, CK<3>, and CK<4> the respective cycles of which are 4T and the phases of which differ from one another in steps of $\pi/2$ are employed and four latch circuits are provided in the sampler section in correspondence with these four clock signals CK<1> to CK<4>. In the case of multiphase clock signals, although the circuit scale of the sampler section is large, the speed required of each circuit clock is relaxed.

In addition, the three clock signals CKXA, CKXB, and CK may be different clock signals or any two clock signals may be common clock signals. In the latter case, for example, the common clock signal has the pulse width $2\tau$ in cycle T, the leading edge of the common clock signal may be denoted the clock signal CKXA, and the trailing edge of the common clock signal may be denoted the clock signal CKXB.

Figure 5:
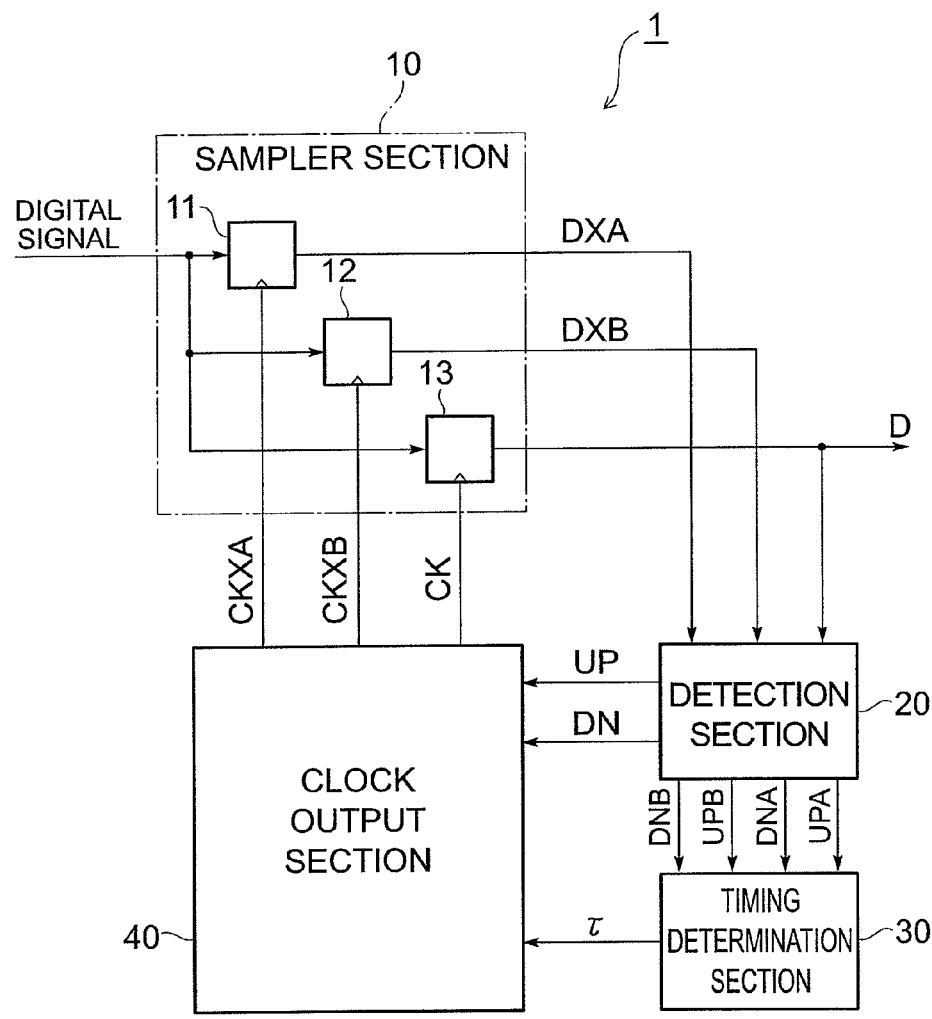
FIG. 5 shows the overall constitution of the whole of the clock data restoration device 1 according to the first embodiment.

FIG. 5 shows the overall constitution of the whole of the clock data restoration device 1 according to the first embodiment. As shown in FIG. 5, the clock data restoration device 1 comprises a sampler section 10, the detection section 20, the timing determination section 30, and the clock output section 40.

The sampler section 10 comprises three latch circuits 11 to 13 to which are input clock signal CKXA, clock signal CKXB and clock signal CK which have the same cycle T and are output by clock output section 40 as well as a restoration target digital signal. The latch circuit 11 samples and holds value DXA (n) of the digital signal at the time indicated by the clock signal CKXA in each period T(n) and outputs value DXA (n) to the detection section 20. The latch circuit 12 samples and holds value DXB(n) of the digital signal at the time indicated by clock signal CKXB in each period T(n) and outputs the value DXB(n) to the detection section 20. In addition, latch circuit 13 samples and holds value D(n) of the digital signal at the time indicated by clock signal CK in each period T(n) and outputs value D(n) to the detection section 20.

The detection section 20 receives inputs of digital value DXA(n), digital value DXB(n) and digital value D(n) which are output by the sampler section 10 in each period T(n). Furthermore, in cases where 'D(n−2)≠D(n−1)', the detection section 20 detects the timing relation (first timing relation) between the time indicated by clock signal CKXA and the transition time of the digital signal value on the basis of value D(n−1), value DXA(n), and value D(n) and outputs a UPA signal and DNA signal which represent the first timing relation to the timing determination section 30. In addition, in cases where 'D(n−2)=D(n−1)', the detection section 20 detects the timing relation (second timing relation) between the time indicated by the clock signal CKXB and the transition time of the digital signal value on the basis of value D(n−1), value DXB(n), and value D(n) and outputs a UPB signal and DNB signal which represent the second timing relation to the timing determination section 30. In addition, the detection section 20 detects the phase relation between the clock signal CK and digital signal on the basis of the first timing relation and second timing relation and outputs a UP signal and DN signal which represent the phase relation to the clock output section 40.

The timing determination section 30 receives the inputs of the UPA signal, DNA signal, UPB signal, and DNB signal which represent the first timing relation and second timing relation which were detected by the detection section 20. Furthermore, the timing determination section 30 determines the timing (that is, the time τ) for each of the clock signal CKXA, clock signal CKXB, and clock signal CK so that the time indicated by clock signal CKXA is at the center of the distribution of transition times of the digital signal value in cases where the respective data of the preceding two bits differ from one another (in cases where 'D(n−2)≠D(n−1)') and so that the time indicated by clock signal CKXB is at the center of the distribution of transition times of the digital signal value in cases where the respective data of the preceding two bits are equal to one another (in cases where 'D(n−2)≠D(n−1)').

The clock output section 40 adjusts cycle T or the phase so that the phase difference between the clock signal CK and digital signal decreases on the basis of the UP signal and DN signal which represent the phase relation detected by the detection section 20 and outputs the clock signal CKXA, clock signal CKXB, and clock signal CK to the sampler section 10 in accordance with the timing determined by the timing determination section 30.

Figure 6:
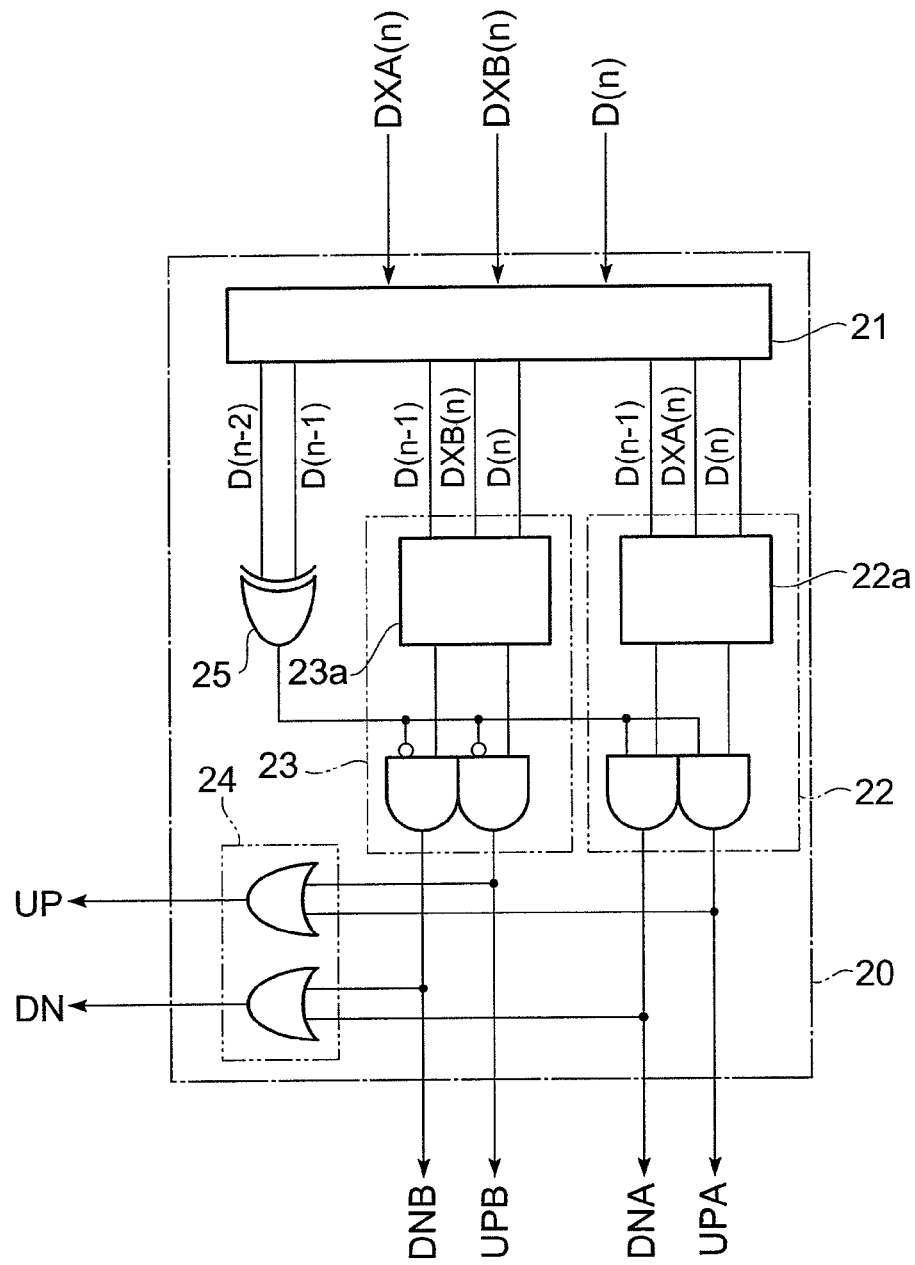
FIG. 6 is a circuit diagram of a detection section 20 which is contained in the clock data restoration device 1 according to the first embodiment.

FIG. 6 is a circuit diagram of the detection section 20 which is contained in the clock data restoration device 1 according to the first embodiment. The detection section 20 comprises a register circuit 21, a timing relation detection circuit 22, a timing relation detection circuit 23, a phase relation detection circuit 24, and an exclusive-OR circuit 25.

The register circuit 21 receives inputs of a digital value DXA (n), digital value DXB(n), and digital value D(n) which are output by the sampler section 10 in each period T(n) and holds these values for a fixed period before outputting same with predetermined timing. In other words, the register circuit 21 outputs value D(n−2) and value D(n−1) to the exclusive-OR circuit 25 at the same time in a certain period, outputs value D(n−1), value D(n), and value DXA(n) to the timing relation detection circuit 22, and outputs value D(n−1), value D(n), and value DXB(n) to the timing relation detection circuit 23. The exclusive-OR circuit 25 receives inputs of value D(n−2) and value D(n−1) which are output by the register circuit 21, outputs a high level value if these two values differ from one another, and outputs a low level value if these two values are equal to one another.

The timing relation detection circuit 22 comprises a phase comparison circuit 22a, receives inputs of value D(n−1), value D(n), and value DXA(n) which are output by register circuit 21 and, in cases where the value output by the exclusive-OR circuit 25 is a high level value (that is, in cases where 'D(n−2)≠D(n−1)'), outputs a UPA signal which is a significant value when 'D(n−1)≠DXA(n)=D(n)' and a DNA signal which is a significant value when 'D(n−1)=DXA(n)≠D(n)' as a signal which represents the first timing relation.

The timing relation detection circuit 23 comprises a phase comparison circuit 23a and receives inputs of value D(n−1), value D(n) and value DXB(n) which are output by the register circuit 21 and, in cases where the value output by the exclusive-OR circuit 25 is a low level value (that is, in cases where 'D(n−2)≠D(n−1)'), outputs a UPB signal which is a significant value when 'D(n−1)≠DXB(n)=D(n)' and a DNB signal which is a significant value when 'D(n−1)=DXB(n)≠D(n)' as a signal which represents the second timing relation.

The phase relation detection circuit 24 outputs a UP signal which represents the logical OR of the UPA signal and UPB signal and a DN signal which represents the logical OR of the DNA signal and DNB signal as signals which represent the phase relation.

(a) of FIG. 7 shows a truth table for the I/O values of the phase comparison circuit 22a which is contained in the timing relation detection circuit 22. In addition, (b) of FIG. 7 shows a truth table of the I/O values of the phase comparison circuit 23a contained in the timing relation detection circuit 23. These two truth tables differ in that one of the three input values is either DXA(n) or DXB(n) and, if this fact is excluded, the relationship between the three input value and the two output values is that of commonality.

When (a) of FIG. 7 is described, as also shown in (a) of FIG. 3, the UPA signal which is a significant value 1 when 'D(n−1)≠DXA(n)=D(n)' indicates whether the sampling time indicated by the clock signal CKXA lags the transition time of the input digital signal value and therefore indicates the necessity to bring the sampling time forward. In addition, as also shown in (b) of FIG. 3, the DNA signal which is a significant value 1 when 'D(n−1)=DXA(n)≠D(n)' indicates whether the sampling time indicated by the clock signal CKXA is earlier than the transition time of the input digital signal value and, therefore, represents the necessity to delay the sampling time.

Similarly, when (b) of FIG. 7 is described, as also shown in FIG. (c) of FIG. 3, the UPB signal which is a significant value 1 when 'D(n−1)≠DXB(n)=D(n)' indicates whether the sampling time indicated by clock signal CKXB lags the transition time of the input digital signal value and, therefore, indicates the necessity to bring the sampling time forward. In addition, as also shown in (d) of FIG. 3, the DNB signal which is a significant value 1 when 'D(n−1)=DXB(n)≠D(n)' indicates whether the sampling time indicated by the clock signal CKXB is earlier than the transition time of the input digital signal value and, therefore, indicates the necessity to delay the sampling time.

Figure 8:
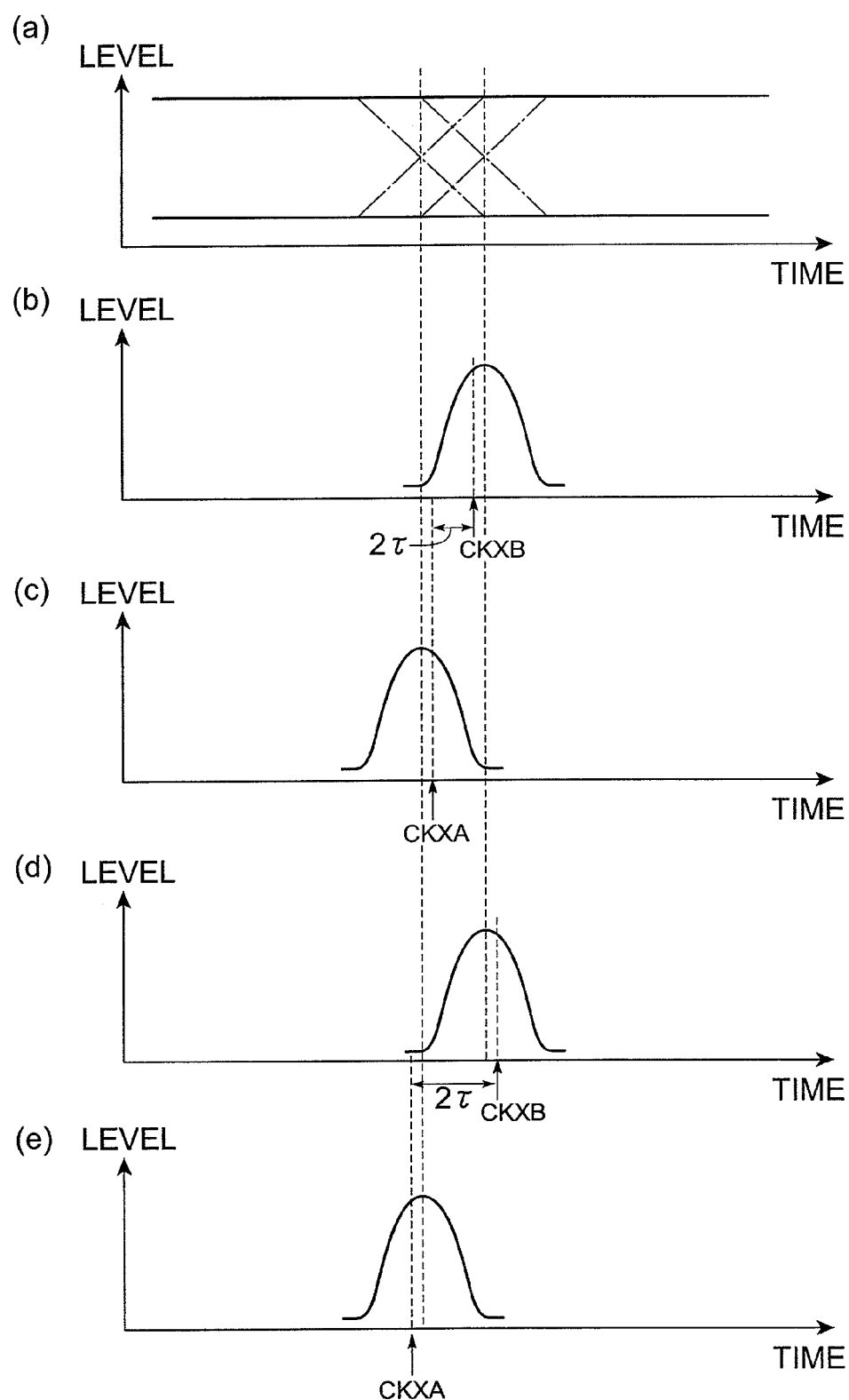
FIG. 8 shows the relationship between the sampling times shown by clock signals CKXA and CKXB and the transition of the input digital signal values.

FIG. 8 shows the relationship between the sampling time indicated by the clock signals CKXA and CKXB and the transition of the input digital signal value. (a) of FIG. 8 schematically shows an eye pattern of a digital signal whose waveform has deteriorated.

In cases where the sampling time indicated by the clock signal CKXA lags the center time of the transition time distribution of the input digital signal value when 'D(n−2)≠D (n−1)' as shown by (c) of FIG. 8, and in cases where the sampling time indicated by the clock signal CKXB is earlier than the center time of the transition time distribution of the input digital signal value when 'D(n−2)≠D(n−1)' as shown in (b) of FIG. 8, the time difference 2τ between the sampling times indicated by clock signals CKXA and CKXB must be increased.

Conversely, in cases where the sampling time indicated by the clock signal CKXA is earlier than the center time of the transition time distribution of the input digital signal value when 'D(n−2)≠D(n−1)' as shown by (e) of FIG. 8, and in cases where the sampling time indicated by the clock signal CKXB is earlier than the center time of the transition time distribution of the input digital signal value when 'D(n−2)=D(n−1)' as shown in (d) of FIG. 8, there is a need to shorten the time difference 2τ between the sampling times indicated by the clock signals CKXA and CKXB.

Figure 9:
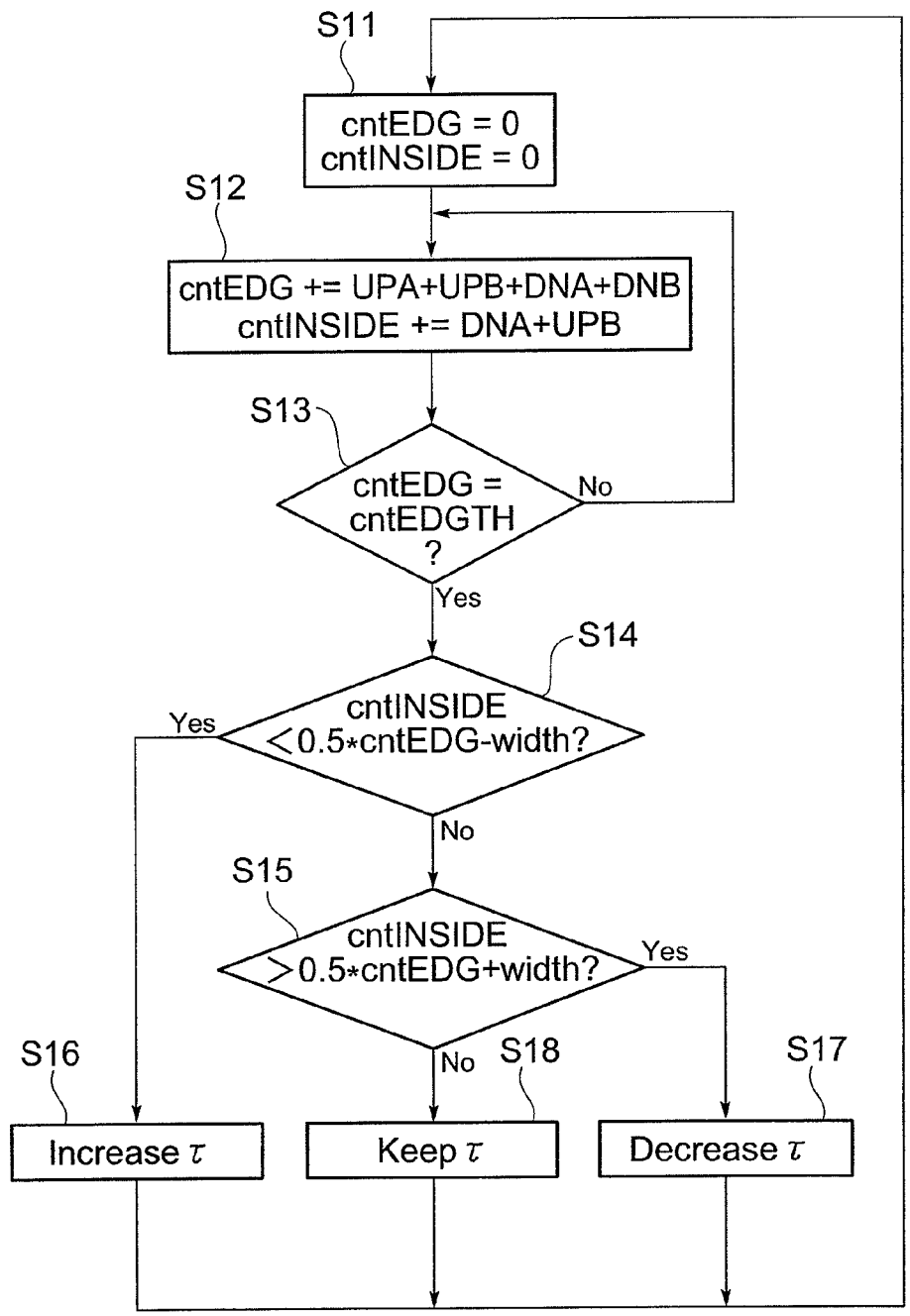
FIG. 9 is a flowchart which illustrates processing by a timing determination section 30 which is contained in the clock data restoration device 1 according to the first embodiment.

The timing determination section 30 indicated by FIG. 5 adjusts time τ by performing the judgment described in FIG. 8. FIG. 9 is a flowchart which describes the processing of the timing determination section 30 which is contained in the clock data restoration device 1 according to the first embodiment. Timing determination section 30 uses variable cntEDG, variable cntINSIDE, constant cntEDGTH, and constant width to perform the following processing.

In step S11, the respective values of variable cntEDG and variable cntINSIDE are set to initial value 0. In step S12 which follows, the sum of the respective values of the UPA signal, UPB signal, DNA signal, and DNB signal is added to the variable cntEDG value and the addition value produces a new value for variable cntEDG. Furthermore, the sum of the respective values of the DNA signal and UPB signal is added to the value of the variable cntINSIDE and the addition value produces a new value for variable cntINSIDE. The processing code '+=' in step S12 indicates cumulative addition. In step S13 which follows, it is judged whether the value of the variable cntEDG is equal to the constant cntEDGTH and, if the value of the variable cntEDG reaches the constant cntEDGTH, the processing advances to step S14 and, if the value of variable cntEDG does not reach the constant cntEDGTH, the processing returns to step S12.

The processing of each of step S12 and step S13 is carried out once in each period T(n). In other words, until it is judged that the value of the variable cntEDG has reached constant cntEDGTH in step S13, the processing of step S12 is carried out once for each period of cycle T. Furthermore, at the point where it is judged that the value of variable cntEDG has reached the constant cntEDGTH in step S13 and the processing advances to step S14, the ratio of the value of variable cntINSIDE with respect to the value of the variable cntEDG represents the relationship between the time difference 2τ between the sampling times indicated by clock signals CKXA and CKXB and the time difference between the center times of the transition time distribution of the input digital signal values in each of the cases where 'D(n−2)≠D(n−1)' and 'D(n−2)=D(n−1)' (that is, any of (b) of FIG. 8, (c) of FIG. 8, (d) of FIG. 8, and (e) of FIG. 8).

In steps S14 and S15, it is judged whether the value of variable cntINSIDE is in any way related to a fixed range which is centered on a value 0.5 times the value of variable cntEDG and whose width is 2width. In cases where it is judged that the value of the variable cntINSIDE is small in comparison with the value obtained by subtracting the positive constant width from 0.5 times the value of the variable cntEDG (0.5*cntEDG-width), value τ is added in step S16 and the new value τ is reported to the clock output section 40. In cases where it is judged that the value of the variable cntINSIDE is large in comparison with the value obtained by adding the positive constant width to 0.5 times the value of the variable cntEDG (0.5*cntEDG+width), value τ is reduced in step S17 and the new value τ is reported to the clock output section 40. In addition, in cases where it is judged that the value of the variable cntINSIDE lies within the fixed range, value τ is maintained in step S18. Further, when the processing of any of steps S16 to S18 is complete, the processing returns to step S11 and the processing described up to this point is repeated.

As a result of the timing determination section 30 performing the above processing, value τ is adjusted so that the value of variable cntINSIDE exists within a fixed range (0.5*cntEDG-width to 0.5*cntEDG+width), that is, so that the difference between the cumulative addition value 'DNA+UPB' and the cumulative addition value 'UPA+DNB' is equal to or less than a reference value. As a result, the time difference 2τ between the sampling times indicated by clock signals CKXA and CKXB is adjusted to match the time difference between the center times of the transition time distributions of the input digital signal value in the respective cases where 'D(n−2)≠D(n−1)' and 'D(n−2)=D(n−1)'.

Figure 10:
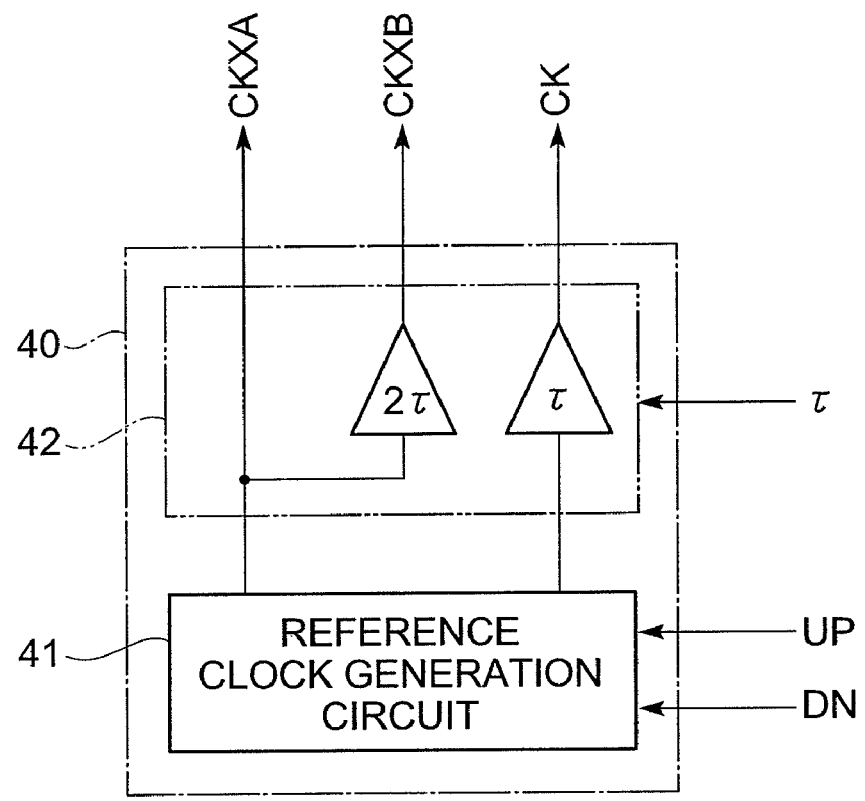
FIG. 10 shows the constitution of a clock output section 40 which is contained in the clock data restoration device 1 according to the first embodiment.

The clock output section 40 shown in FIG. 5 adjusts cycle T or the phase so that the phase difference between clock signal CK and the digital signal decreases on the basis of the UP signal and DN signal output by the detection section 20 and outputs clock signal CKXA, clock signal CKXB, and clock signal CK to the sampler section 10 based on the value τ determined by the timing determination section 30. FIG. 10 shows the constitution of the clock output section 40 which is contained in the clock data restoration device 1 according to the first embodiment. As shown in FIG. 10, the clock output section 40 comprises the reference clock generation circuit 41 and the delay circuit 42.

Figure 11:
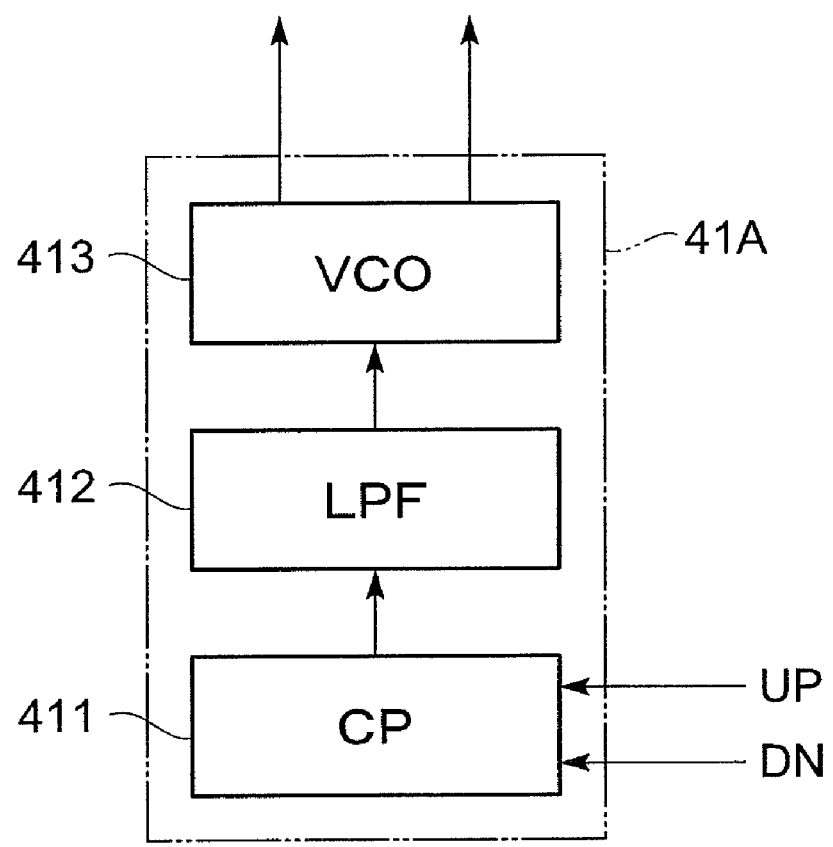
FIG. 11 shows the circuit constitution of a first embodiment of a reference clock generation circuit 41.
Figure 12:
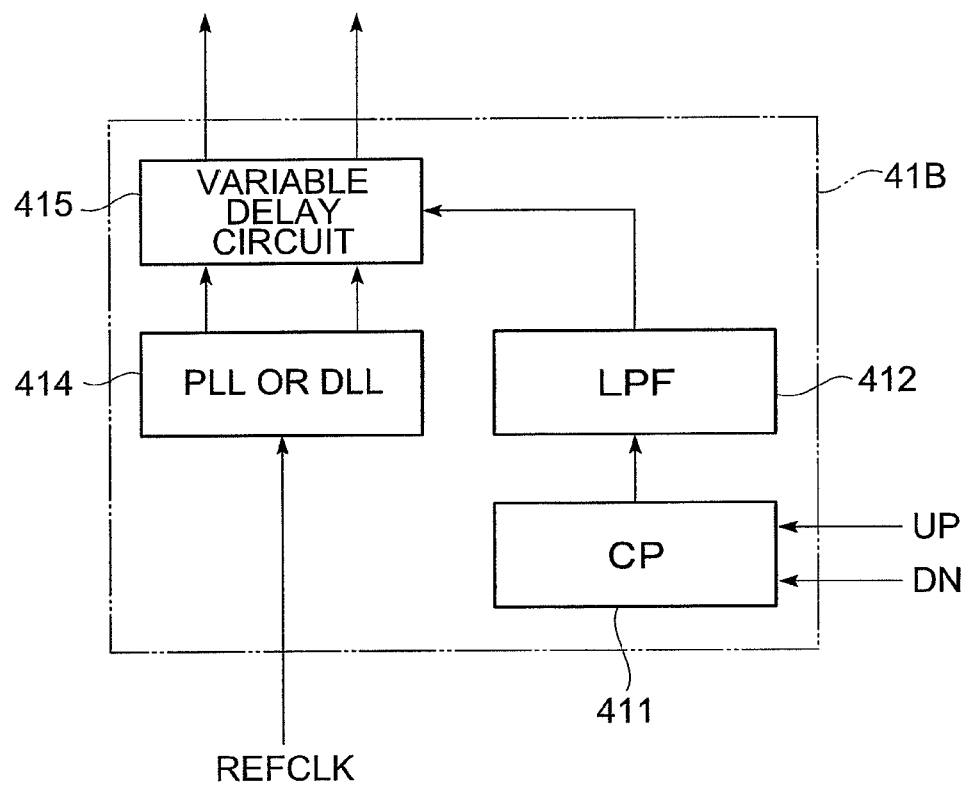
FIG. 12 shows the circuit constitution of a second embodiment of the reference clock generation circuit 41.
Figure 13:
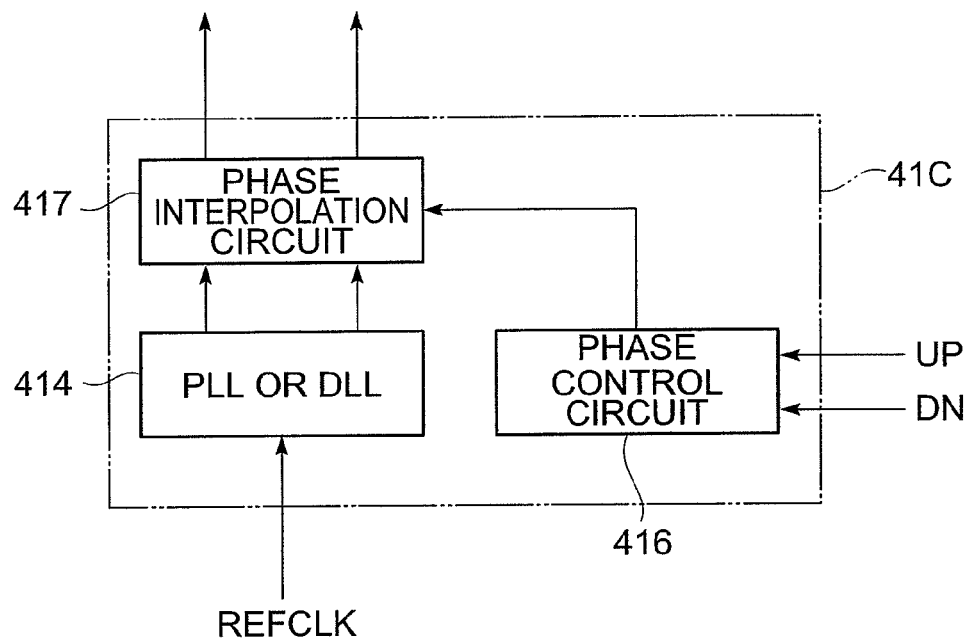
FIG. 13 shows the circuit constitution of a third embodiment of the reference clock generation circuit 41.

The reference clock generation circuit 41 generates a reference clock signal which is obtained by adjusting cycle T or the phase on the basis of the UP signal and DN signal which are output by the detection section 20. A variety of embodiments are possible for the circuit constitution of the reference clock generation circuit 41 as shown in FIGS. 11 to 13. The delay circuit 42 adds the required delay to the reference clock signal which is output by the reference clock generation circuit 41 in accordance with the timing determined by the timing determination section 30, generates clock signal CKXA, clock signal CKXB, and clock signal CK and outputs these signals. Here, clock signals CKXA, CKXB, and CK are generated and output so that the timing of the sampling indicated by clock signal CKXB lags the timing of the sampling indicated by clock signal CKXA by time 2τ and so that the timing of the sampling indicated by clock signal CK lags the timing of the sampling indicated by clock signal CKXA by time (T/2+τ).

FIG. 11 shows the circuit constitution of a first embodiment of the reference clock generation circuit 41. The reference clock generation circuit 41A shown in FIG. 11 comprises a CP (Charge Pump) circuit 411, an LPF (Lowpass Filter) circuit 412, and a VCO (Voltage-Controlled Oscillator) circuit 413. In the reference clock generation circuit 41A, the CP circuit 411 to which the UP signal and DN signal output by the detection section 20 are input outputs either a charging or discharging electric current pulse to the LPF circuit 412 depending on whether either of the UP signal and DN signal is the significant value. The LPF circuit 412 receives an input of the electric current pulse which is output by the CP circuit 411 and increases or reduces the output voltage value as a result of either the charging or discharging by the input electric current pulse. The VCO circuit 413 then generates a clock signal of a cycle which corresponds with the output voltage value from the LFP circuit 412 and outputs the reference clock signal to the delay circuit 42. The cycle of the clock signal which is output by the VCO circuit 413 to the delay circuit 42 is adjusted on the basis of the UP signal and DN signal.

FIG. 12 shows the circuit constitution of a second embodiment of the reference clock generation circuit 41. A reference clock generation circuit 41B, which is shown in FIG. 12, comprises the CP circuit 411, the LPF circuit 412, the PLL (Phase-Lock Loop) circuit 414, and the variable delay circuit 415. In the reference clock generation circuit 41B, the CP circuit 411 to which the UP signal and DN signal output by the detection section 20 are input outputs either a charging or discharging electric current pulse to the LPF circuit 412 depending on whether either of the UP signal and DN signal is the significant value. The LPF circuit 412 receives an input of the electric current pulse which is output by the CP circuit 411 and increases or reduces the output voltage value as a result of either the charging or discharging by the input electric current pulse. The PLL circuit 414 generates a multiphase clock from an input clock REFCLK and outputs the multiphase clock to the variable delay circuit 415. Furthermore, the variable delay circuit 415 receives an input of the multiphase clock which is output by the PLL circuit 414, adds a delay which corresponds with the voltage value output by the LPF circuit 412 to the multiphase clock, and outputs the delay-added clock to the delay circuit 42. The phase of the clock signal which is output by the variable delay circuit 415 to the delay circuit 42 is adjusted on the basis of the UP signal and DN signal. A DLL (Delay Lock Loop) circuit may also be used in place of the PLL circuit.

FIG. 13 shows the circuit constitution of the third embodiment of the reference clock generation circuit 41. The reference clock generation circuit 41C shown in FIG. 13 comprises the PLL circuit 414, phase control circuit 416, and phase interpolation circuit 417. In the reference clock generation circuit 41C, the phase control circuit 416 to which the UP signal and DN signal output by the detection section 20 are input outputs a control signal to indicate an increase or decrease in the phase adjustment amount of the phase interpolation circuit 417 depending on whether the UP signal and DN signal is the significant value. The PLL circuit 414 generates a multiphase clock from the input clock REFCLK and outputs the multiphase clock to the phase interpolation circuit 417. The phase interpolation circuit 417 then receives an input of the multiphase clock which is output by the PLL circuit 414, adjusts the phase of the multiphase clock by means of interpolation on the basis of the control signal output by the phase control circuit 416 and outputs the phase-adjusted clock to the delay circuit 42. The phase of the clock signal which is output from the phase interpolation circuit 417 to the delay circuit 42 is adjusted on the basis of the UP signal and DN signal. The DLL circuit may also be used in place of the PLL circuit.

In the clock data restoration device 1 which is constituted in this manner, the respective phases of the clock signal CKXA, clock signal CKXB, and clock signal CK are adjusted to match the phase of the input digital signal by means of the processing of a loop which comprises the sampler section 10, detection section 20, timing determination section 30, and clock output section 40. In addition, as a result of the loop processing, the digital signal sampling time indicated by the clock signal CKXA is adjusted to match the peak time of the distribution of data transition times in a case where the value D (n−2) and value D(n−1) of the preceding two bits differ from one another and the digital signal sampling time indicated by the clock signal CKXB is adjusted to match the peak time of the distribution of data transition times in a case where the value D (n−2) and value D(n−1) of the preceding two bits are equal to one another. Furthermore, any of the clock signal CKXA, clock signal CKXB, and clock signal CK is output as the restored clock signal. Chronological order data for digital value D(n) are also output as the restored data.

Figure 14:
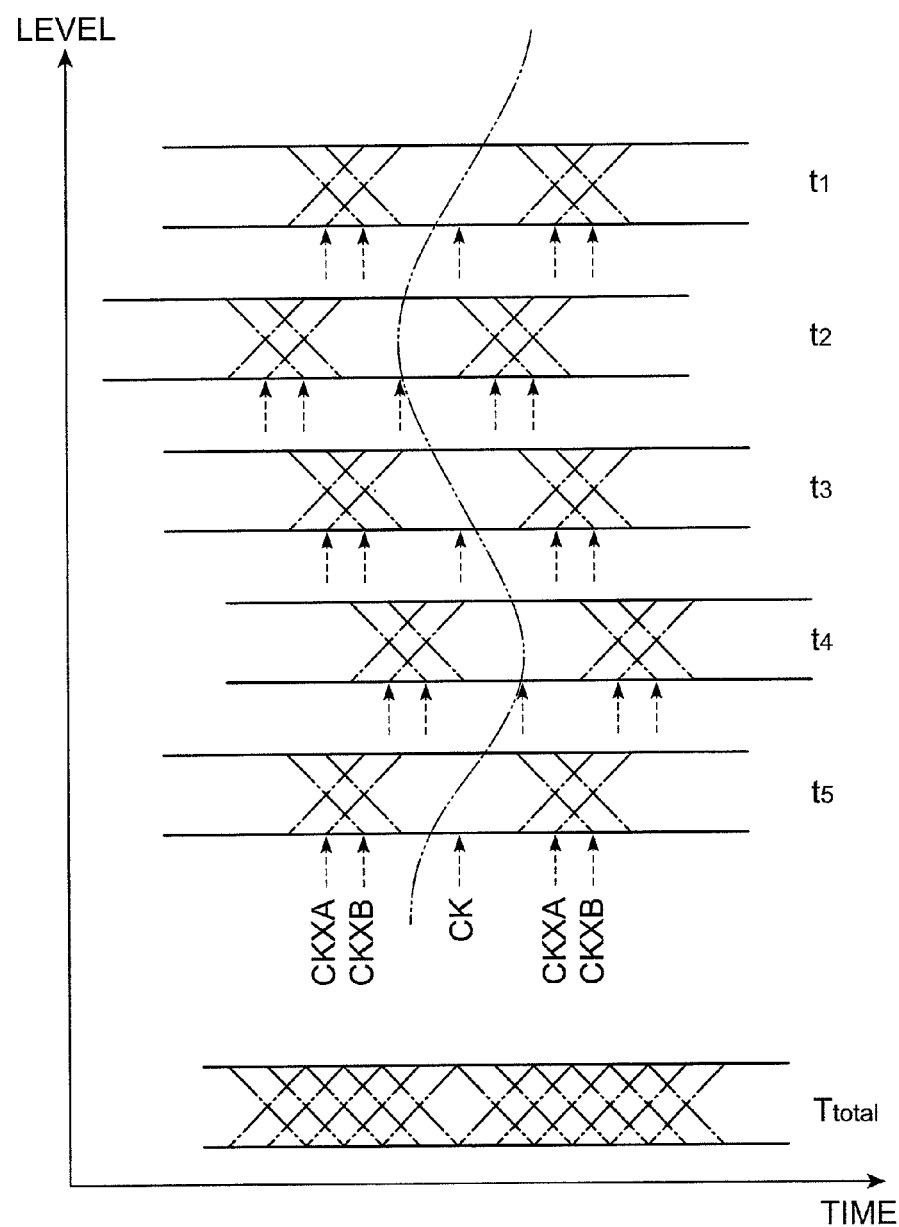
FIG. 14 shows the timing of the sampling indicated by the clock signal CKXA, clock signal CKXB, and clock signal CK of the clock data restoration device 1 according to the first embodiment.

FIG. 14 shows the timing for sampling indicated by each of the clock signal CKXA, clock signal CKXB, and clock signal CK of the clock data restoration device 1 according to the first embodiment. FIG. 14 shows an eye pattern of an input digital signal at times $t_1$, $t_2$, $t_3$, $t_4$, and $t_5$ which elapse in chronological order and an eye pattern which spans a long period Ttotal of the input digital signal. Changes in the data transition times of the input digital signal arise due to transmitter clock jitter which arises due to supply voltage fluctuations of the transmitter which transmits the digital signal or other noise, and intersymbol interference due to a mixture of an irregular data pattern of the digital signal and attenuation of the transmission path.

In FIG. 14, the two dot chain line which chronologically connects the center times of the data stability periods is a curved line and results from the transmitter clock jitter. Furthermore, the phenomenon according to which the data transition times differ depending on the difference between the value D(n−2) and value D(n−1) of the preceding two bits is due to intersymbol interference. In cases where the transmitter clock jitter is large, the eye closes in the eye pattern which spans a long period of the input digital signal as indicated by an overlaid pattern in the period Ttotal in FIG. 14 and, when the sampling times of the digital signal are matched close to the two ends of the distribution of data transition times as per the device disclosed in Patent Document 2 (See (d) of FIG. 2), the sampling times cannot be determined and, therefore, the center time of the data stability period cannot be determined either.

In contrast, with the clock data restoration device 1 according to the first embodiment, the timing of the peak of the distribution of data transition times in a case where the respective data of the preceding two bits differ from one another is indicated by the clock signal CKXA and the timing of the peak of the distribution of data transition times in a case where the respective data of the preceding two bits are equal to one another is indicated by clock signal CKXB (See (a) of FIG. 2, (b) of FIG. 2, and (c) of FIG. 2). Therefore, the timing times indicated by each of the clock signals CKXA, CKXB, and CK can be determined in a short period. In other words, the clock data restoration device 1 according to the first embodiment is able to restore the clock signal and data stably even in cases where the transmitter clock jitter and intersymbol interference are large.

Second Embodiment

Figure 15:
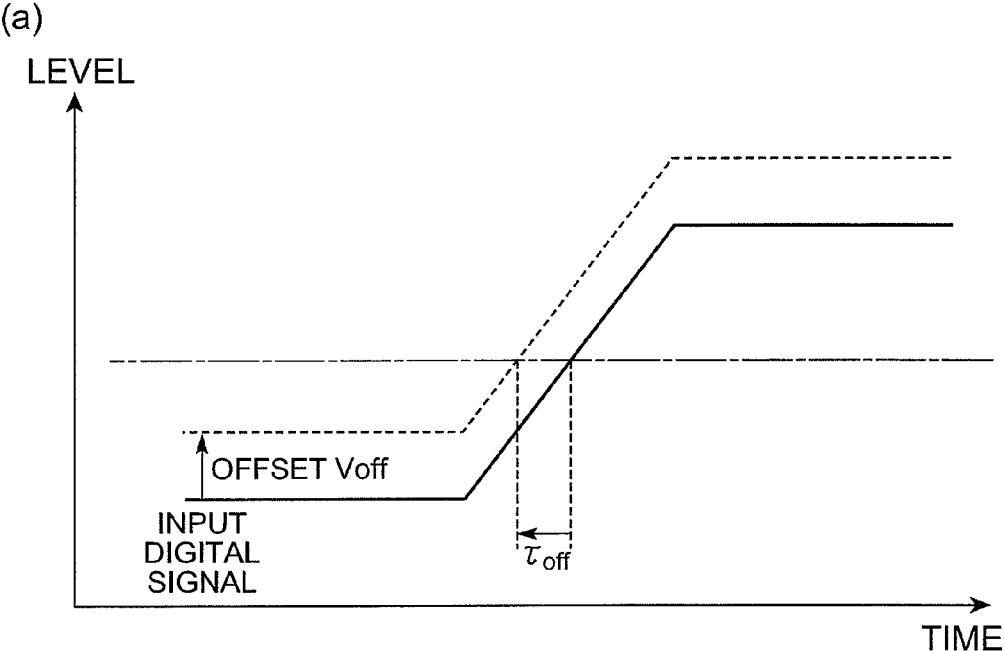
FIG. 15 illustrates the relationship between the timing for sampling the digital signal data and the offset.
Figure 15:
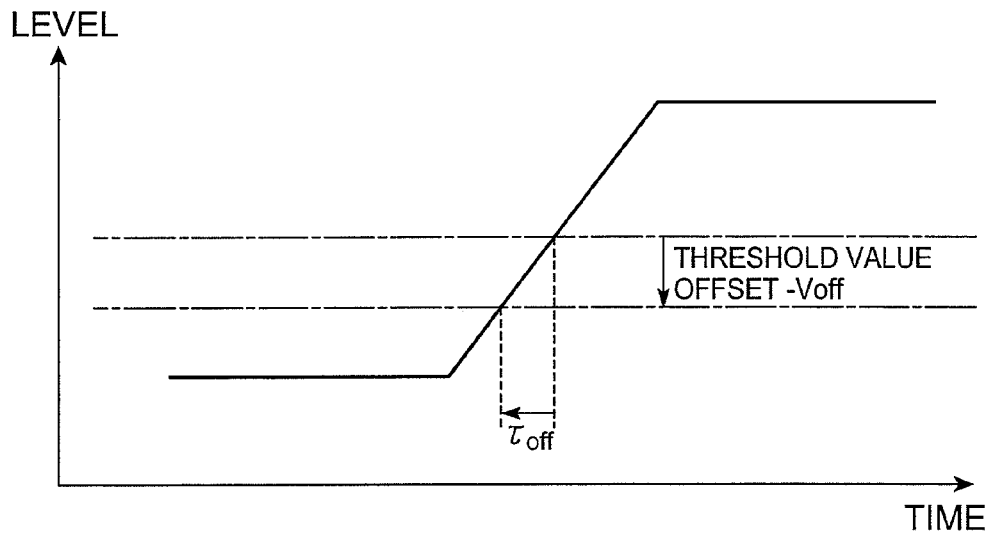

The second embodiment of the clock data restoration device according to the present invention will be described next. FIG. 15 illustrates the relationship between the timing for sampling the digital signal data and the offset. In (a) of FIG. 15, the signal indicated by the broken line is obtained by adding offset Voff to the input digital signal indicated by the bold line. When the sampling of the signal to which the offset Voff has been added and the original input digital signal by means of the same latch circuit is considered, in comparison with the timing of the sampling of the original input digital signal, the timing of the sampling of the signal to which the offset Voff has been added is equivalent to timing which is time doff (=Voff/Slew Rate) earlier. In addition, the result of sampling the input digital signal to which the offset Voff has been added by means of a latch circuit can also be obtained by performing sampling with an input digital signal to which the offset has not been applied serving as a threshold value (−Voff), that is, by applying an offset to the sampling threshold, as shown in (b) of FIG. 15. Therefore, of the two equivalent methods for applying an offset, a constitution for performing processing equivalent to the case of the first embodiment where the sampling time of the input digital signal is adjusted by adjusting the offset applied to the input digital signal will be described as the second embodiment.

Figure 16:
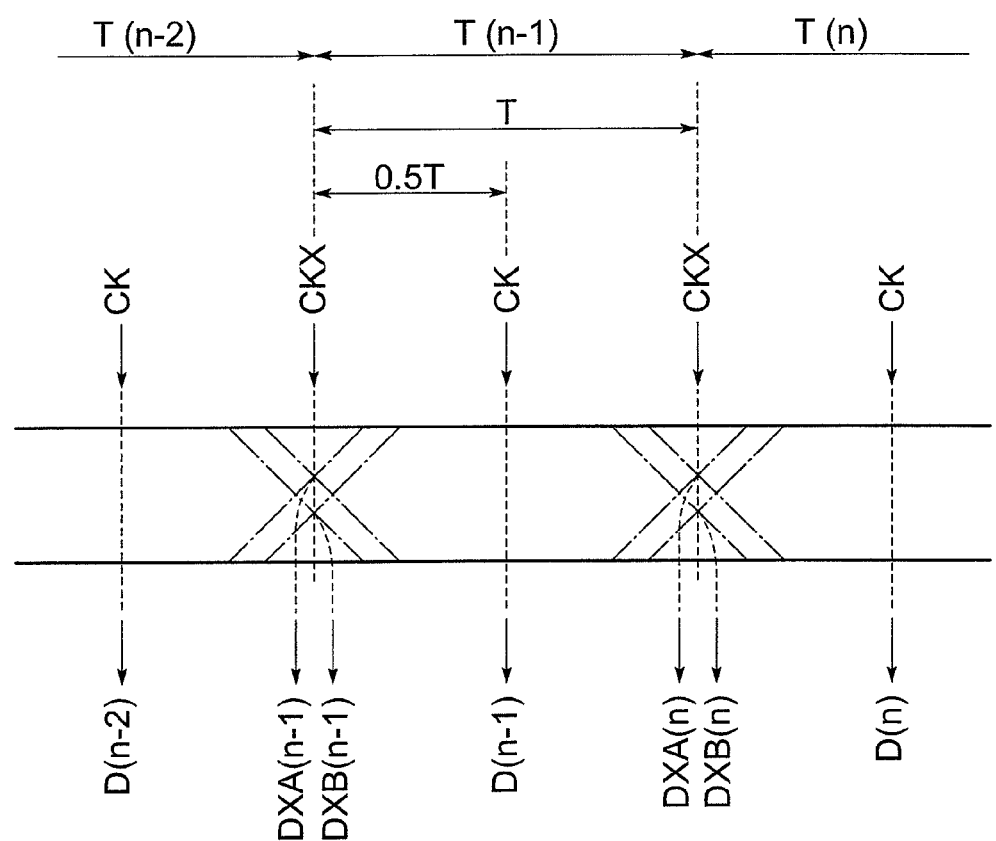
FIG. 16 illustrates the timing for sampling digital signal data of a clock data restoration device 2 according to a second embodiment.

The clock data restoration device 2 according to the second embodiment indicates the timing for sampling the data of the digital signal by means of clock signal CK and indicates the timing for sampling the data of the signal obtained by applying an offset (±Voff) to the digital signal by means of clock signal CKX. FIG. 16 illustrates the timing for sampling the data of the digital signal of the clock data restoration device 2 according to the second embodiment. FIG. 16 schematically shows the eye pattern of the digital signal and the timing for sampling the data is indicated by CKX and CK. For the sake of simplicity, the offset of the digital signal is shown aligned and is shown in a form where the offset has been applied to the sampling threshold value. However, as explained hereinabove, this operation is equivalent to a case where the offset is added to the signal.

The two clock signals CKX and CK have the same cycle T. The sampling time $t_X$ indicated by clock signal CKX and the sampling time $t_C$ indicated by clock signal CK have the relationship '$t_C - t_X = T/2$'. In addition, in each nth period T(n) of cycle T, the sampling times indicated by each of the two clock signals CKX and CK are arranged in the order of clock signal CKX followed by clock signal CK. n is an optional integer.

The value of the first signal which is sampled at the time indicated by clock signal CKX in each period T(n) (=input digital signal −Voff) is denoted DXA(n), the value of the second signal which is sampled at the time indicated by clock signal CKX in each period T(n) (=input digital signal +Voff) is denoted DXB(n), and the value of the input digital signal which is sampled at the time indicated by clock signal CK in each period T(n) is denoted D(n), where the cycle T and offset amount Voff are adjusted by the clock data restoration device 2.

Each of the two clock signals CKX and CK may be single phase clock signals or multiphase clock signals. For example, when a case where a clock signal CK has four phases is considered, four clock signals CK<1>, CK<2>, CK<3>, and CK<4> the respective cycles of which are 4T and the phases of which differ from one another in steps of π/2 are employed and four latch circuits are provided in the sampler section in correspondence with these four clock signals CK<1> to CK<4>. In the case of multiphase clock signals, although the circuit scale of the sampler section is large, the speed required of each circuit clock is relaxed.

In addition, the two clock signals CKX and CK may be different clock signals or any two clock signals may be common clock signals. In the latter case, for example, the common clock signal has the pulse width T/2 in period T, the leading edge of the common clock signal may be denoted the clock signal CKX, and the trailing edge of the common clock signal may be denoted the clock signal CK.

Figure 17:
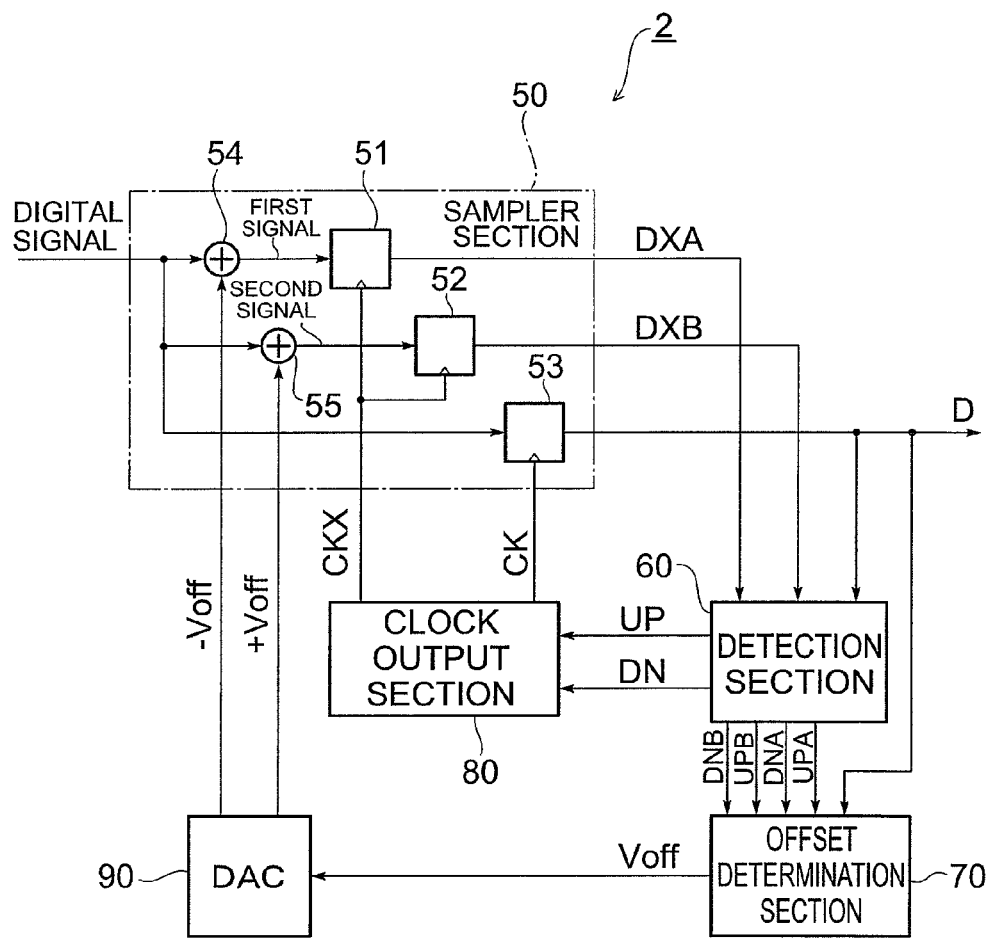
FIG. 17 shows the overall constitution of the whole of clock data restoration device 2 according to the second embodiment.

FIG. 17 shows the overall constitution of the whole of clock data restoration device 2 according to the second embodiment. As shown in FIG. 17, the clock data restoration device 2 comprises a sampler section 50, a detection section 60, an offset determination section 70, a clock output section 80, and a DA conversion section 90.

The sampler section 50 comprises three latch circuits 51 to 53 and two addition circuits 54 and 55 to which are input clock signal CKX and clock signal CK which have the same cycle T and are output by clock output section 80, a voltage value (±Voff) which is output by the DA conversion section 90, and a restoration target digital signal. The addition circuit 54 adds the offset voltage value (−Voff) to the input digital signal and outputs a first signal which results from the addition to latch circuit 51. The addition circuit 55 adds the offset voltage value (+Voff) to the input digital signal and outputs a second signal which results from the addition to latch circuit 52. The latch circuit 51 samples and holds value DXA (n) of the first signal at the time indicated by the clock signal CKX in each period T(n) and outputs the value DXA (n) to the detection section 60. The latch circuit 52 samples and holds value DXB(n) of the second signal at the time indicated by clock signal CKX in each period T(n) and outputs the value DXB(n) to the detection section 60. In addition, latch circuit 53 samples and holds value D(n) of the digital signal at the time indicated by clock signal CK in each period T(n) and outputs the value D(n) to the detection section 60 and offset determination section 70.

In cases where the constitution is such that, instead of applying an offset to the input digital signal, the sampling threshold value of the latch circuit is offset, the addition circuit 54 and addition circuit 55 can be omitted. In this case, the voltage value Voff and −Voff which are output by the DA conversion section 90 are each input to the latch circuit 51 and latch circuit 52. Further, the latch circuit 51 and latch circuit 52 each sample and hold the input digital signal at the time indicated by the clock signal CKX according to a threshold value which is shifted by Voff and −Voff and output the input digital signal to detection section 60. Here, the DA conversion section 90 outputs the offset voltages Voff and −Voff for latch circuits 51 and 52. However, in the case of a signal that causes the latch circuits 51 and 52 to offset the sampling threshold value by Voff and −Voff, the offset voltages Voff and −Voff may also be omitted.

The detection section 60 receives inputs of digital value DXA(n), digital value DXB(n) and digital value D(n) which are output by the sampler section 50 in each period T(n). Furthermore, in cases where value D(n−2) is a high level, the detection section 60 detects the timing relation (first timing relation) between the time indicated by clock signal CKX and the transition time of the digital signal value on the basis of value D(n−1), value DXA(n), and value D(n) and outputs a UPA signal and DNA signal which represent the first timing relation to the offset determination section 70. In addition, in cases where value D(n−2) is a low level, the detection section 20 detects the timing relation (second timing relation) between the time indicated by the clock signal CKX and the transition time of the digital signal value on the basis of value D(n−1), value DXB(n), and value D(n) and outputs a UPB signal and DNB signal which represent the second timing relation to the offset determination section 70. In addition, the detection section 20 detects the phase relation between the clock signal CK and digital signal on the basis of the first timing relation and second timing relation and outputs a UP signal and DN signal which represent the phase relation to the clock output section 80.

Depending on whether the case is either of the cases where 'D(n−2)≠D(n−1)' and 'D(n−2)=D(n−1)', the detection section 20 of the first embodiment selectively output a signal from either the timing relation detection circuit 22 or timing relation detection circuit 23. In contrast, depending on whether the value D(n−2) is a high level or a low level, the detection section 60 of the second embodiment selectively outputs a signal from either a timing relation detection circuit 62 or a timing relation detection circuit 63. This is based on the result of considering the equivalent relationship between the timing adjustment and offset amount adjustment as described using FIG. 15.

The offset determination section 70 receives inputs of the UPA signal, DNA signal, UPB signal, and DNB signal which represent the first and second timing relations detected by the detection section 60 and receives an input of the digital value D(n) which is output by the sampler section 50. The offset determination section 70 then determines the offset amount Voff of the sampler section 50 so that the time indicated by clock signal CKX is at the center of the distribution of transition times of the value of the first signal in cases where value D(n−2) is a high level and so that the time indicated by clock signal CKX is at the center of the distribution of transition times of the value of the second signal in cases where value D(n−2) is a low level, and reports the offset amount Voff thus determined to the DA conversion section 90.

The clock output section 80 adjusts cycle T or phase so that the phase difference between the clock signal CK and digital signal is small on the basis of the UP signal and DN signal representing the phase relation detected by the detection section 60 and outputs the clock signal CKX and clock signal CK to the sampler section 50. The DA conversion section 90 outputs the offset amount reported by the offset determination section 70 to the sampler section 50 as an analog voltage value.

Figure 18:
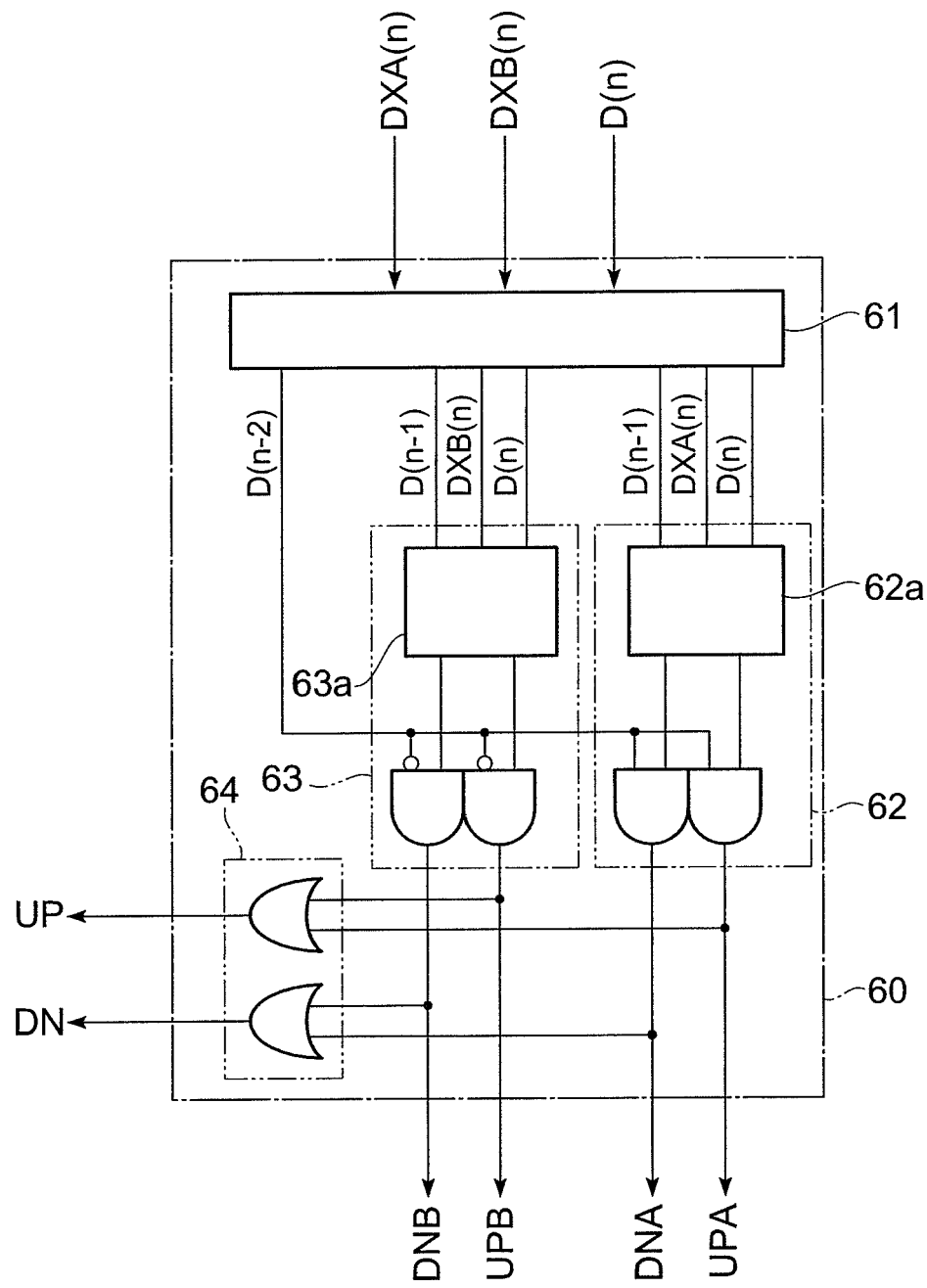
FIG. 18 is a circuit diagram of a detection section 60 which is contained in the clock data restoration device 2 according to the second embodiment.

FIG. 18 is a circuit diagram of the detection section 60 which is contained in the clock data restoration device 2 according to the second embodiment. The detection section 60 comprises a register circuit 61, timing relation detection circuit 62, timing relation detection circuit 63, and a phase relation detection circuit 64.

The register circuit 61 receives inputs of the digital value DXA(n), digital value DXB(n), and digital value D(n) which are output by the sampler section 50 in each period T(n), holds the digital value DXA(n), digital value DXB(n), and digital value D(n) for a fixed period, and outputs same with predetermined timing. That is, the register circuit 61 outputs value D(n−2), value D(n−1), value D(n), and value DXA(n) to the timing relation detection circuit 62 simultaneously in a certain period and outputs value D(n−2), value D(n−1), value D(n), and value DXB(n) to the timing relation detection circuit 63.

The timing relation detection circuit 62 comprises a phase comparison circuit 62a and receives the inputs of the value D(n−2), value D(n−1), value D(n), and value DXA(n) which are output by the register circuit 61. In cases where value D(n−2) is a high level value, the timing relation detection circuit 62 outputs the UPA signal, which is a significant value when 'D(n−1)≠DXA(n)=D(n)', and the DNA signal, which is a significant value when 'D(n−1)=DXA(n)≠D(n)', as signals representing the first timing relation. The truth table for I/O values of the phase comparison circuit 62a which is contained in the timing relation detection circuit 62 is the same as that shown in (a) of FIG. 7.

The timing relation detection circuit 63 comprises a phase comparison circuit 63a and receives the inputs of the value D(n−2), value D(n−1), value D(n), and value DXB(n) which are output by the register circuit 61. In cases where value D(n−2) is a high level value, the timing relation detection circuit 63 outputs the UPB signal, which is a significant value when 'D(n−1)≠DXB(n)=D(n)', and the DNB signal, which is a significant value when 'D(n−1)=DXB(n)≠D(n)', as signals representing the second timing relation. The truth table for I/O values of the phase comparison circuit 63a which is contained in the timing relation detection circuit 63 is the same as that shown in (b) of FIG. 7.

The phase relation detection circuit 64 outputs a UP signal which represents the logical OR of the UPA signal and UPB signal and a DN signal which represents the logical OR of the DNA signal and DNB signal as signals which represent the phase relation.

Figure 19:
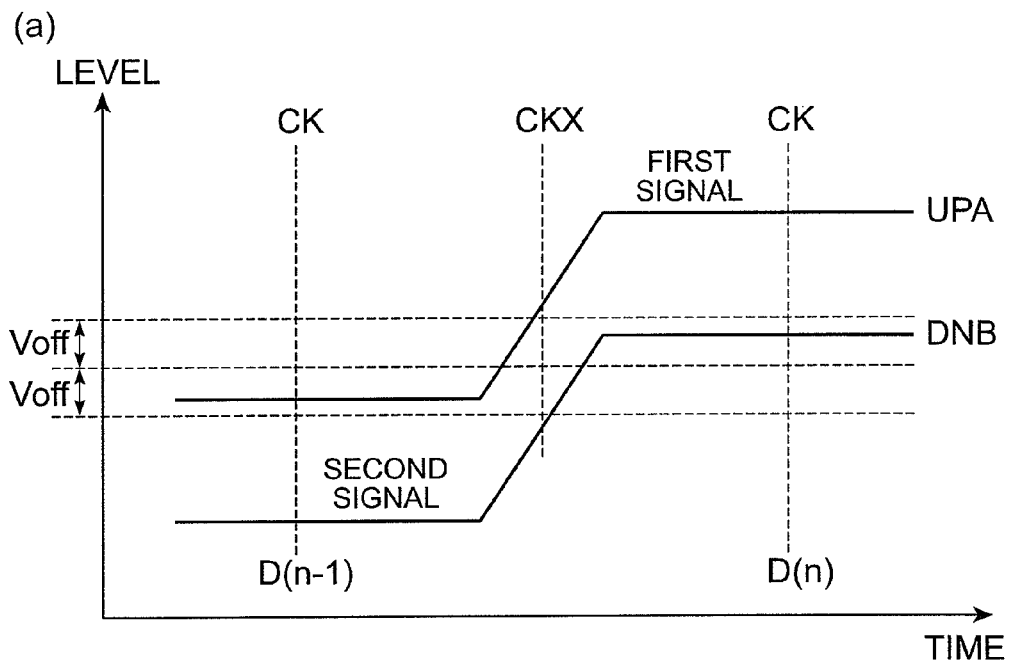
FIG. 19 shows the relationship between the sampling time indicated by clock signal CKX and the offset amount Voff.
Figure 19:
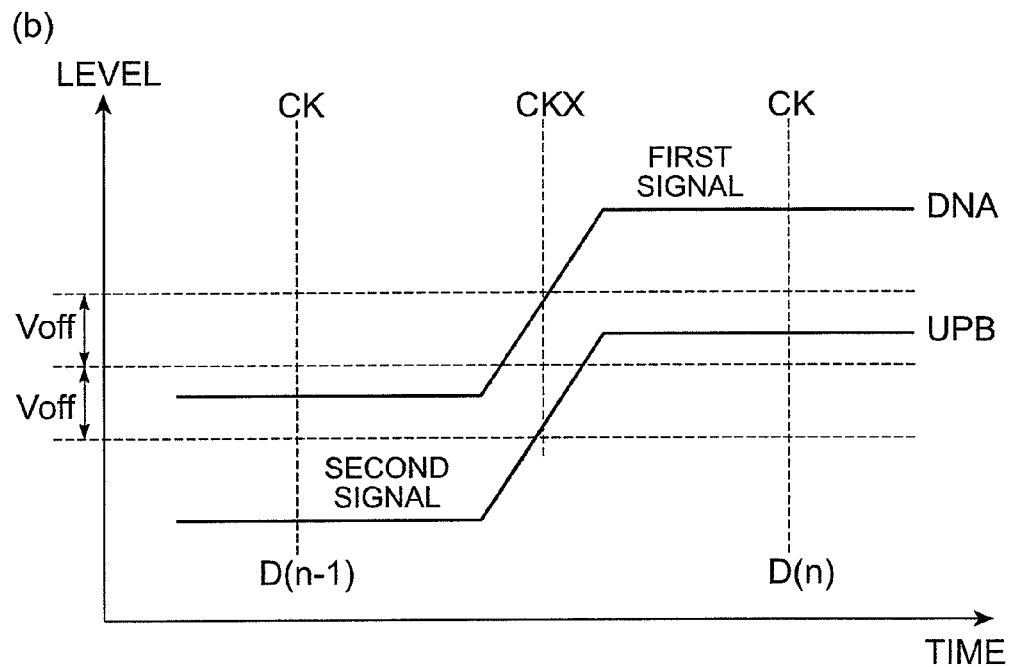

FIG. 19 shows the relationship between the sampling time indicated by clock signal CKX and the offset amount Voff. As shown in (a) of FIG. 19, in cases where the sampling time indicated by the clock signal CKX lags the center time of the transition time distribution of the value of the first signal in cases where value D(n−2) is a high level and where the sampling time indicated by the clock signal CKX is earlier than the center time of the transition time distribution of the value of the second signal in cases where value D(n−2) is a low level, the offset amount Voff must be increased. Conversely, as shown in (b) of FIG. 19, in cases where the sampling time indicated by the clock signal CKX is earlier than the center time of the transition time distribution of the value of the first signal in cases where value D(n−2) is a high level and where the sampling time indicated by the clock signal CKX lags the center time of the transition time distribution of the value of the second signal in cases where value D(n−2) is a low level, the offset amount Voff must be reduced. FIG. 19 shows a case where the digital signal value transitions from a low level to a high level but is also similar to a case where the digital signal value transitions from a high level to a low level.

Figure 20:
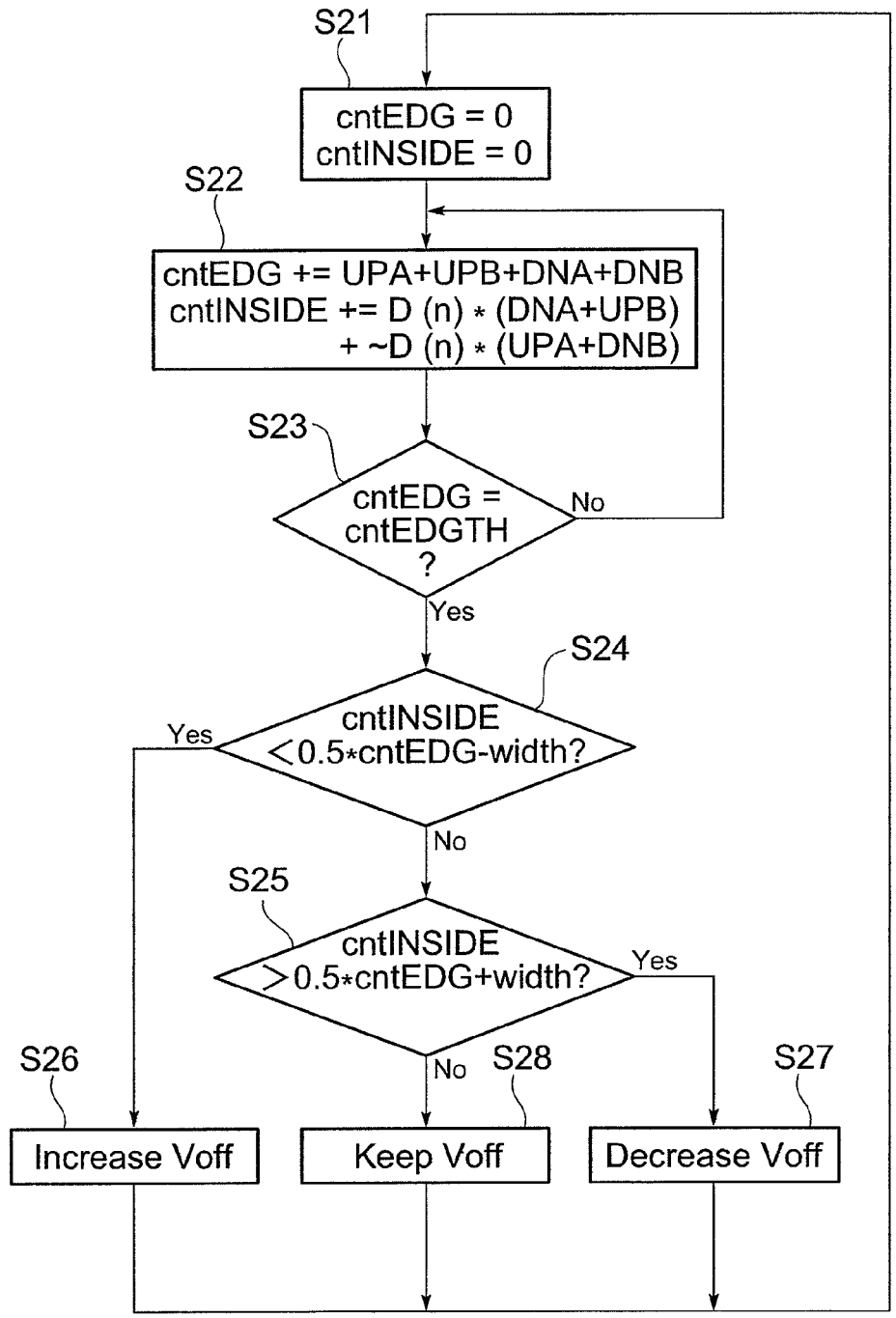
FIG. 20 is a flowchart which illustrates the processing of the offset determination section 70 which is contained in the clock data restoration device 2 according to the second embodiment.

The offset determination section 70 adjusts the offset amount Voff by performing a judgment such as that illustrated by FIG. 19. FIG. 20 is a flowchart which illustrates the processing of the offset determination section 70 which is contained in the clock data restoration device 2 according to the second embodiment. The offset determination section 70 performs the following processing by using variable cntEDG, variable cntINSIDE, constant cntEDGTH, constant width, and value D(n).

In step S21, the respective values of variable cntEDG and variable cntINSIDE are set at an initial value 0. In step S22 which follows, the sum of the respective values of the UPA signal, UPB signal, DNA signal, and DNB signal is added to the value of variable cntEDG and the addition value produces a new value for variable cntEDG Furthermore, in step S22, the sum of the respective values of the DNA signal and UPB signal is added to the value of the variable cntINSIDE when value D(n) is a high level and the sum of the respective values of the UPA signal and DNB signal is added to the value of variable cntINSIDE when value D(n) is a low level, and the addition value produces a new value for variable cntINSIDE. The code '~' in step S22 indicates inversion of the signal level. In addition, in step S23 which follows, it is judged whether the value of the variable cntEDG is equal to the constant cntEDGTH and, if the value of the variable cntEDG reaches the constant cntEDGTH, the processing advances to step S24 and, if the value of variable cntEDG does not reach the constant cntEDGTH, the processing returns to step S22.

The processing of each of step S22 and step S23 is carried out once in each period T(n). In other words, until it is judged that the value of the variable cntEDG has reached constant cntEDGTH in step S23, the processing of step S22 is carried out once for each period of cycle T. Furthermore, at the point where it is judged that the value of variable cntEDG has reached the constant cntEDGTH in step S23 and the processing advances to step S24, the ratio of the value of variable cntINSIDE with respect to the value of the variable cntEDG represents either of (a) of FIG. 19 and (b) of FIG. 19.

In steps S24 and S25, it is judged whether the value of variable cntINSIDE is in any way related to a fixed range which is centered on a value 0.5 times the value of variable cntEDG and whose width is 2width. In cases where it is judged that the value of the variable cntINSIDE is small in comparison with the value obtained by subtracting the positive constant width from 0.5 times the value of the variable cntEDG (0.5*cntEDG−width), the offset amount Voff is increased in step S26 and the new offset amount Voff is reported to the DA conversion section 90. In cases where it is judged that the value of the variable cntINSIDE is large in comparison with the value obtained by adding the positive constant width to 0.5 times the value of the variable cntEDG (0.5*cntEDG+width), the offset amount Voff is reduced in step S27 and the new offset amount Voff is reported to the DA conversion section 90. In addition, in cases where it is judged that the value of the variable cntINSIDE lies within the fixed range, the offset amount Voff is maintained in step S28. Further, when the processing of any of steps S26 to S28 is complete, the processing returns to step S21 and the processing described up to this point is repeated.

The clock data restoration device 2 constituted as detailed hereinabove comprises a first loop which comprises the sampler section 50, the detection section 60, and the clock output section 80 and a second loop which comprises the sampler section 50, detection section 60, offset determination section 70, and DA conversion section 90. As a result of the processing of these two loops, the respective phases of the clock signal CKX and clock signal CK are adjusted to match the phase of the input digital signal, the sampling time indicated by the clock signal CKX is adjusted to match the peak time of the distribution of the data transition times of a first signal in a case where value D(n−2) is a high level, and the sampling time indicated by the clock signal CKX is adjusted to match the peak time of the distribution of data transition times of a second signal in a case where value D(n−2) is a low level. Further, either the clock signal CKX or clock signal CK is output as the restored clock signal. In addition, chronological data of digital value D(n) are output as the restored data.

As per the clock data restoration device 1 according to the first embodiment, the clock data restoration device 2 according to the second embodiment is able to restore the clock signal and data stably even in cases where the transmitter clock jitter and intersymbol interference are large. The clock data restoration device 2 according to the second embodiment can also exhibit the following effects. That is, whereas the number of clock signals required is three in the first embodiment, the number of clock signals required may be two in the second embodiment. In addition, whereas the timing of the respective clocks is adjusted in the first embodiment, the offset amount applied to the input digital signal is adjusted in the second embodiment. Generally, the offset amount adjustment can be made straightforward and highly accurate in comparison with the timing adjustment. Based on this fact, the clock signals and data can be restored more stably in the second embodiment than in the first embodiment.

Third Embodiment

The third embodiment of the clock data restoration device according to the present invention will be described next. The clock data restoration device 3 according to the third embodiment described hereinbelow performs processing which is equivalent to that of the clock data restoration device 2 according to the second embodiment.

Figure 21:
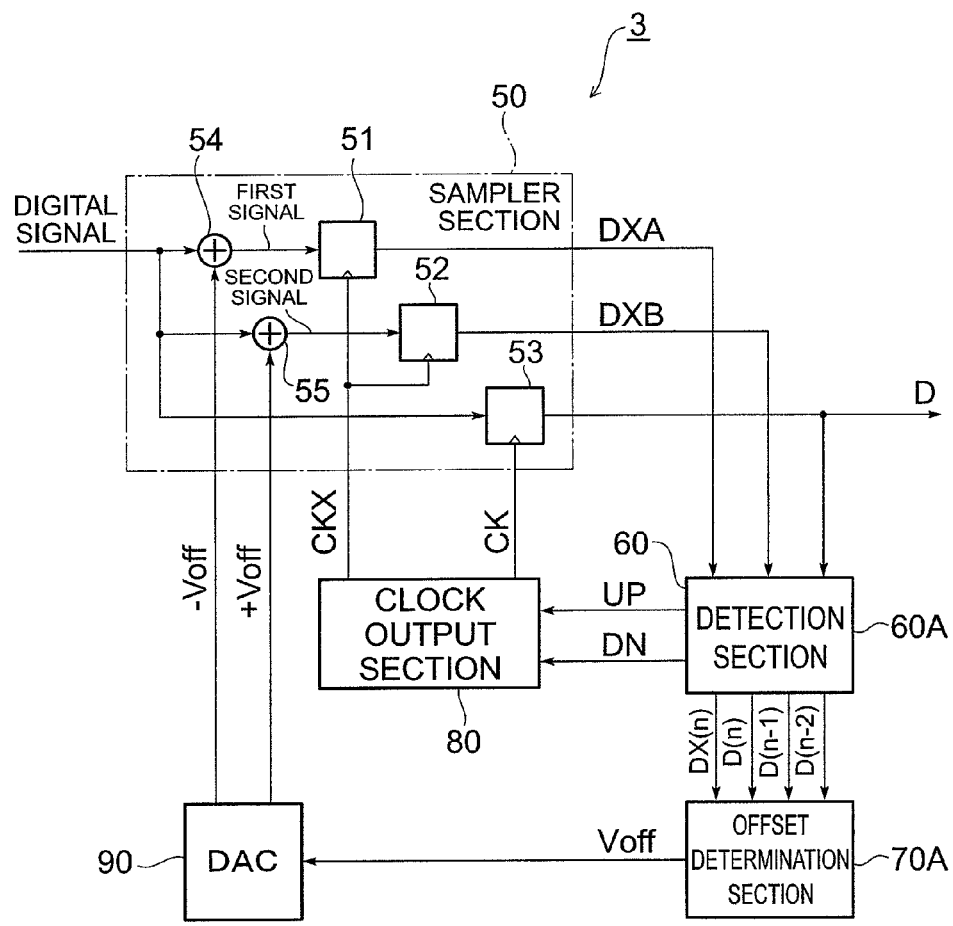
FIG. 21 shows the overall constitution of the whole of a clock data restoration device 3 according to a third embodiment.

FIG. 21 shows the overall constitution of the whole of the clock data restoration device 3 according to the third embodiment. As shown in FIG. 21, the clock data restoration device 3 comprises the sampler section 50, the detection section 60A, the offset determination section 70A, the clock output section 80, and the DA conversion section 90. The sampler section 50, clock output section 80, and DA conversion section 90 are each the same as those contained in the clock data restoration device 2 according to the second embodiment.

The detection section 60A receives inputs of digital value DXA(n), digital value DXB(n), and digital value D(n) which are output by the sampler section 50 in each period T(n). The detection section 60A then lets 'DX(n)=DXA(n)' when value D(n−2) is a high level, lets 'DX(n)=DXB(n)' when value D(n−2) is a low level, detects the phase relation between the clock signal CK and digital signal on the basis of value D(n−1), value DX(n), and value D(n), and outputs the UP signal and DN signal which represent the phase relation to the clock output section 80.

Based on value DX(n), value D(n−2), value D(n−1), and value D(n), the offset determination section 70A determines the offset amount Voff of the sampler section 50 so that the time indicated by clock signal CKX is the center of the transition time distribution of the value of the first signal in cases where value D(n−2) is a high level and so that the time indicated by the clock signal CKX is the center of the transition time distribution of the value of the second signal in cases where value D(n−2) is a low level, and reports the offset amount Voff thus determined to the DA conversion section 90.

Figure 22:
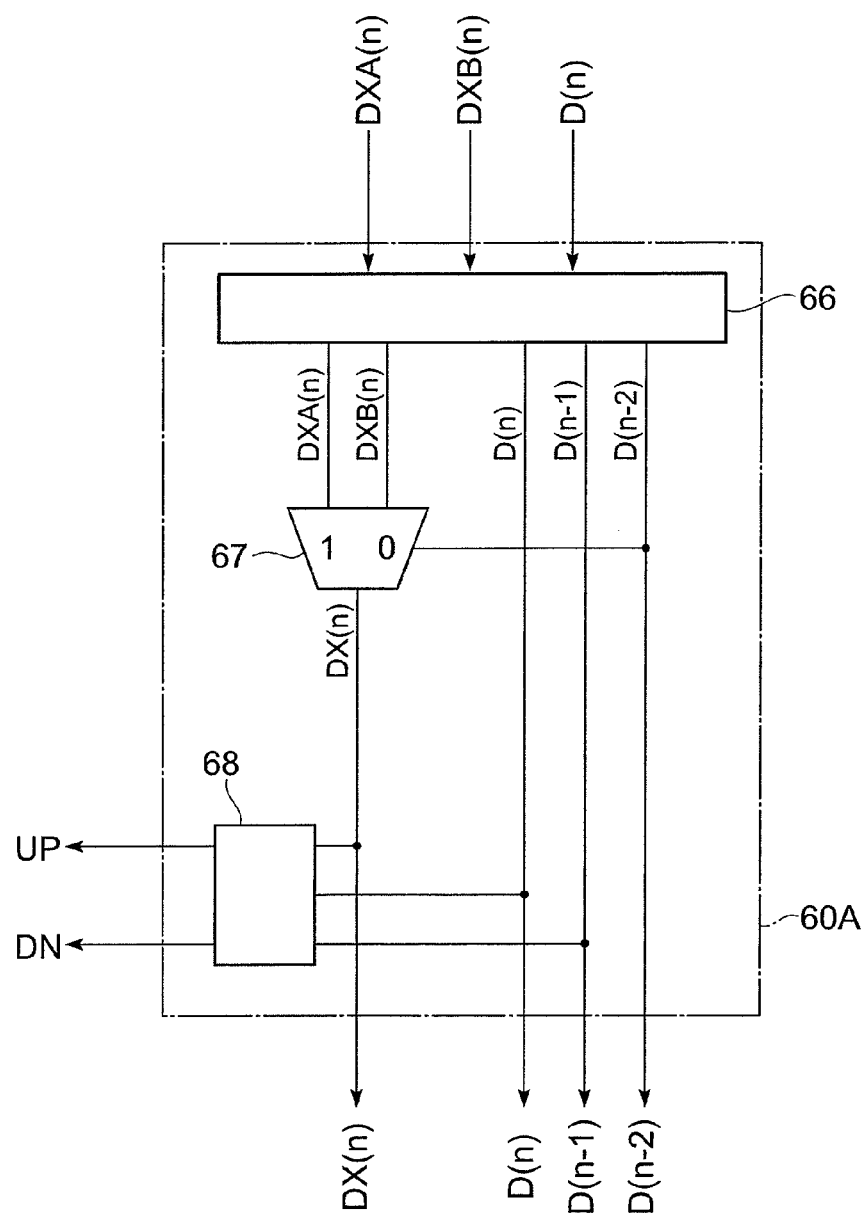
FIG. 22 is a circuit diagram of a detection section 60A which is contained in the clock data restoration device 3 according to the third embodiment.

FIG. 22 is a circuit diagram of the detection section 60A which is contained in the clock data restoration device 3 according to the third embodiment. The detection section 60A comprises register circuit 66, selection circuit 67, and phase relation detection circuit 68.

The register circuit 66 receives inputs of the digital value DXA(n), digital value DXB(n), and digital value D(n) which are output by the sampler section 50 in each period T(n), holds the digital value DXA(n), digital value DXB(n), and digital value D(n) for a fixed period, and outputs same with predetermined timing. That is, the register circuit 66 outputs value D(n−2), value D(n−1), value D(n), value DXA(n), and value DXB(n) at the same time in a certain period.

A selection circuit 67 receives inputs of value D(n−2), value DXA(n), and value DXB(n) which are output by register circuit 66 and outputs value DXA(n) as value DX(n) when value D(n−2) is a high level and outputs value DXB(n) as value DX(n) when value D(n−2) is a low level.

The phase relation detection circuit 68 receives inputs of value D(n) and value D(n−1) which are output by register circuit 66, receives an input of value DX(n) which is output by selection circuit 67, and performs logic processing which corresponds with the truth table shown in FIG. 23, outputting the UP signal and DN signal. In other words, the phase relation detection circuit 68 outputs a UP signal which is a significant value when 'D(n−1)≠DX(n)=D(n) and a DN signal which is a significant value when 'D(n−1)=DX(n)≠D(n)' as signals which represent the phase relation.

In comparison with the detection section 60 (FIG. 18) of the second embodiment, the detection section 60A (FIG. 22) of the third embodiment only differs in the order of performing the processing to select either value DXA(n) and value DXB(n) in relation to the generation of the UP signal and DN signal and processing to detect the phase relation. Therefore, both embodiments perform equivalent processing with respect to the generation of the UP signal and DN signal.

Figure 24:
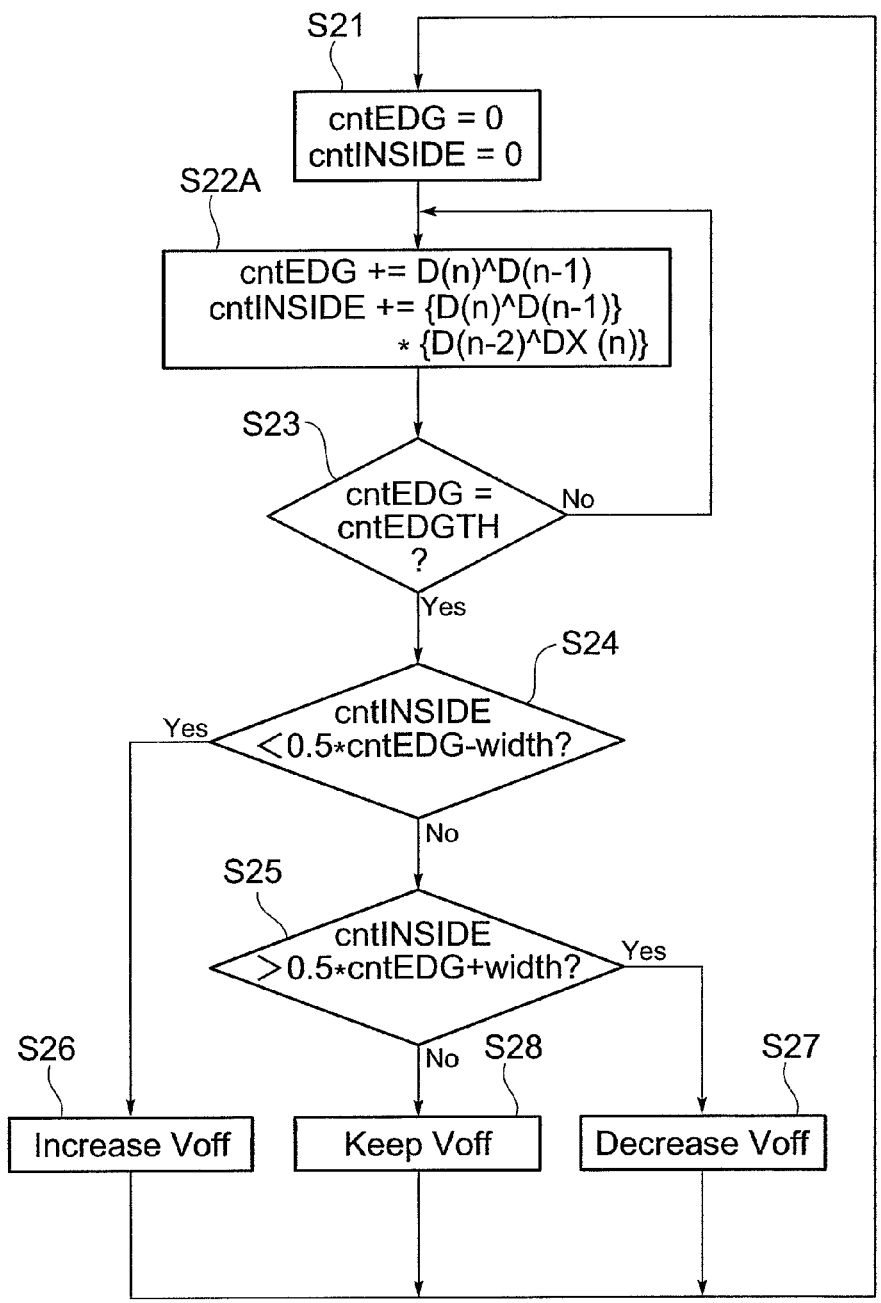
FIG. 24 is a flowchart which illustrates the processing of an offset determination section 70A which is contained in the clock data restoration device 3 according to the third embodiment.

FIG. 24 is a flowchart which illustrates the processing of an offset determination section 70A which is contained in the clock data restoration device 3 according to the third embodiment. In comparison with the offset determination section 70 of the second embodiment, the offset determination section 70A of the third embodiment differs in that step S22A is provided in place of step S22.

In other words, in step S22A, the value 'D(n)^D(n−1)' is added to the value of the variable cntEDG and the addition value produces a new value for variable cntEDG. Furthermore, in step S22A, the value of '{D(n)^D(n−1)}*{D(n−2)^DX(n)}' is added to the value of variable cntINSIDE and the addition value produces a new value for variable cntINSIDE. Here, the processing symbol '^' represents the exclusive-OR. The processing of step S22A of the third embodiment and the processing of step S22 of the second embodiment are equivalent to one another. This fact will be described hereinbelow.

In the second embodiment, each of the UPA signal, DNA signal, UPB signal, and DNB signal are defined by the following Equation (1). In addition, each of the UP signal and DN signal will be defined by Equation (2). Further, when an adjustment is made by substituting Equation (1) with Equation (2), Equation (3) is obtained. DX(n) in Equation (3c) is a value which is output by selection circuit 67 which is contained in the detection section 60A of the third embodiment. In addition, UP of Equation (3a) and DN of Equation (3b) are values which are output by the phase relation detection circuit 68 which is contained in the detection section 60A of the third embodiment. In other words, detection section 60A of the third embodiment and detection section 60 of the second embodiment perform equivalent processing with respect to the generation of the UP signal and DN signal.

$$UPA \equiv D(n-2)*\{D(n)^\wedge D(n-1)\}*\{D(n)^\wedge DXA(n)\} \quad (1a)$$

$$DNA \equiv D(n-2)*\{D(n)^\wedge D(n-1)\}*\{D(n)^\wedge DXA(n)\} \quad (1b)$$

$$UPB \equiv D(n-2)*\{D(n)^\wedge D(n-1)\}*\{D(n)^\wedge DXA(n)\} \quad (1c)$$

$$DNB \equiv D(n-2)*\{D(n)^\wedge D(n-1)\}*\{D(n)^\wedge DXA(n)\} \quad (1d)$$

$$UP \equiv UPA + UPB \quad (2a)$$

$$DN \equiv DNA + DNB \quad (2b)$$

$$UP \equiv \{D(n)^\wedge D(n-1)\}*\{D(n)^\wedge DX(n)\} \quad (3a)$$

$$DN \equiv \{D(n)^\wedge D(n-1)\}*\{D(n)^\wedge DX(n)\} \quad (3a)$$

where $$DX(n) = D(n-2)*DXA(n) + D(n-2)*DXB(n) \quad (3c)$$

In the processing of step S22 of the offset determination section 70 according to the second embodiment, the right side of first equation is ΔcntEDGE and the right side of second equation is ΔcntINSIDE. When an adjustment is made by employing Equation (1), ΔcntEDGE is represented by Equation (4) below and ΔcntINSIDE is represented by Equation (5) below. These Equations (4) and (5) match the right side of each of the first and second equations of the processing of step S22A of offset determination section 70A according to the third embodiment. In other words, the offset determination section 70A of the third embodiment and the offset determination section 70 of the second embodiment perform equivalent processing.

$$\Delta cntEDGE \equiv UPA + DNA + UPB + DNB \quad (4)$$
$$= D(n)^\wedge D(n-1)$$

$$\Delta cntINSIDE \equiv D(n)*(UPB + DNA) + \sim D(n)*(UPA + DNB) \quad (5)$$
$$= \{D(n)^\wedge D(n-1)\} * D(n-2)^\wedge DX(n)$$

Therefore, the clock data restoration device 3 according to the third embodiment is able to operate in the same way as the clock data restoration device 2 according to the second embodiment and afford the same effects as the clock data restoration device 2 and, in addition, in comparison with the detection section 60 of the second embodiment, the detection section 60A of the third embodiment has a small circuit scale and therefore permits miniaturization.

INDUSTRIAL APPLICABILITY

The present invention can be applied to a clock data restoration device.

The invention claimed is:

1. A clock data restoration device which restores a clock signal and data based on an input digital signal, comprising:
a sampler section, which receives an input of a clock signal CKXA, a clock signal CKXB, and a clock signal CK which have a same cycle T as well as the input digital signal, and which samples, holds, and outputs, in each nth period T(n) of the cycle T, a digital value DXA(n) of the input digital signal at a time $t_{XA}$ indicated by the clock signal CKXA, a digital value DXB(n) of the input digital signal at a time $t_{XB}$ indicated by the clock signal CKXB, and a digital value D(n) of the input digital signal at a time $t_C$ indicated by the clock signal CK (where $t_{XA} < t_{XB} < t_C$, and n is an integer);
a detection section, which receives an input of the digital value DXA(n), digital value DXB(n), and digital value D(n) which are output by the sampler section in each period T(n) and, in a case where 'D(n−2)≠(n−1)', detects a timing relation (called a 'first timing relation' hereinbelow) between a time indicated by the clock signal CKXA and a transition time of the input digital signal value based on digital value D(n−1), digital value DXA(n), and digital value D(n) and, in a case where 'D(n−2)=D(n−1)', detects a timing relation (called a 'second timing relation' hereinbelow) between a time indicated by the clock signal CKXB and a transition time of the input digital signal value based on the digital value D(n−1), digital value DXB(n), and digital value D(n), and detects a phase relation between the clock signal CK and the input digital signal based on the first timing relation and the second timing relation;
a timing determination section which determines, based on the first timing relation and the second timing relation detected by the detection section, an interval 2τ between respective timings of the clock signal CKXA and the clock signal CKXB so that the time indicated by the clock signal CKXA is the center of the transition time distribution of the input digital signal value in a case where 'D(n−2)≠D(n−1)' and so that the time indicated by the clock signal CKXB is the center of the transition time distribution of the input digital signal value in a case where 'D(n−2)≠(n−1)'; and
a clock output section which adjusts cycle T or the phase based on the phase relation detected by the detection section so that a phase difference between the clock signal CK and the input digital signal decreases, and which outputs the clock signal CKXA, the clock signal CKXB, and the clock signal CK which satisfy relations '$t_{XA} = t_c - T/2 - \tau$' and '$t_{XB} = t_c - T/2 + \tau$' to the sampler section in accordance with the timings determined by the timing determination section.

2. The clock data restoration device according to claim 1, wherein the detection section comprises:

a first timing relation detection circuit which, in cases where 'D(n−2)≠D(n−1)', outputs a UPA signal which is a significant value when 'D(n−1)≠DXA(n)=D(n)' and outputs a DNA signal which is a significant value when 'D(n−1)=DXA(n)≠D(n)', as signals which represent the first timing relation;

a second timing relation detection circuit which, in cases where 'D(n−2)=D(n−1)', outputs a UPB signal which is a significant value when 'D(n−1)≠DXB(n)=D(n)' and outputs a DNB signal which is a significant value when 'D(n−1)=DXB(n)≠D(n)', as signals which represent the second timing relation; and a phase relation detection circuit which outputs a UP signal which represents logical OR of the UPA signal and the UPB signal, and a DN signal which represents logical OR of the DNA signal and the DNB signal as signals which represent the phase relation.

3. The clock data restoration device according to claim 2, wherein the timing determination section determines each of the timings of the clock signal CKXA, the clock signal CKXB, and the clock signal CK so that the difference between a ratio between a cumulative addition value cntINSIDE of 'DNA+UPB' and a cumulative addition value cntEDGE of 'UPA+UPB+DNA+DNB' (cntINSIDE/cntEDGE) and the value 0.5 is equal to or less than a predetermined reference value.

4. The clock data restoration device according to claim 3, wherein the clock output section comprises:

a reference clock generation circuit which generates a reference clock signal obtained by adjusting cycle T or phase based on the UP signal and the DN signal; and a delay circuit which applies a desired delay to the reference clock signal in accordance with the timing determined by the timing determination section, generates the clock signal CKXA, the clock signal CKXB, and the clock signal CK, and outputs these signals.

5. A clock data restoration device which restores a clock signal and data based on an input digital signal, comprising:

a sampler section which receives an input of a clock signal CKX and a clock signal CK which have a same cycle T as well as the input digital signal, generates a first signal by applying an offset (−Voff) to the input digital signal, generates a second signal by applying an offset (+Voff) to the input digital signal, and which samples, holds, and outputs, in each nth period T(n) of the cycle T, a digital value DXA(n) of the first signal and a digital value DXB(n) of the second signal at a time $t_X$ indicated by the clock signal CKX, and a digital value D(n) of the input digital signal at a time $t_C$ indicated by the clock signal CK (where $t_X<t_C$, and n is an integer);

a detection section which receives an input of the digital value DXA(n), the digital value DXB(n), and the digital value D(n) which are output by the sampler section in each period T(n) and, in a case where value D(n−2) is at a high level, detects a timing relation (called the 'first timing relation' hereinbelow) between a time indicated by the clock signal CKX and a transition time of a value of the first signal based on digital value D(n−1), digital value DXA(n), and digital value D(n) and, in a case where the digital value D(n−2) is at a low level, detects a timing relation (called the 'second timing relation' hereinbelow) between a time indicated by the clock signal CKX and a transition time of a value of the second signal based on the digital value D(n−1), digital value DXB(n), and digital value D(n), and detects a phase relation between the clock signal CK and the input digital signal based on the first timing relation and the second timing relation;

an offset determination section which determines, based on the first timing relation and the second timing relation detected by the detection section, an offset amount of the sampler section so that the time indicated by the clock signal CKX is the center of transition time distribution of the value of the first signal in a case where the digital value D(n−2) is at a high level and so that the time indicated by the clock signal CKX is the center of transition time distribution of the value of the second signal in a case where the digital value D(n−2) is at a low level; and a clock output section, which adjusts cycle T or the phase based on the phase relation detected by the detection section so that a phase difference between the clock signal CK, and the input digital signal decreases, and which outputs the clock signal CKX and the clock signal CK, which satisfy relation '$t_C-t_X=T/2$', to the sampler section.

6. The clock data restoration device according to claim 5, wherein the detection section comprises:

a first timing relation detection circuit which, in cases where the digital value D(n−2) is at a high level, outputs a UPA signal which is a significant value when 'D(n−1)≠DXA(n)=D(n)', and a DNA signal which is a significant value when 'D(n−1)=DXA(n)≠D(n)', as signals which represent the first timing relation;

a second timing relation detection circuit which, in cases where the digital value D(n−2) is at a low level, outputs a UPB signal which is a significant value when 'D(n−1)≠DXB(n)=D(n)', and a DNB signal which is a significant value when 'D(n−1)=DXB(n)≠D(n)', as signals which represent the second timing relation; and a phase relation detection circuit which outputs a UP signal which represents logical OR of the UPA signal and the UPB signal, and a DN signal which represents logical OR of the DNA signal and the DNB signal, as signals which represent the phase relation.

7. The clock data restoration device according to claim 6, wherein the offset determination section determines the offset amount of the sampler section so that the difference between the ratio of a cumulative addition value cntINSIDE of 'D(n)(DNA+UPB)+D(n)(UPA+DNB)' and a cumulative addition value cntEDGE of 'UPA+UPB+DNA+DNB' (cntINSIDE/cntEDGE) and the value 0.5 is equal to or less than a predetermined reference value.

8. The clock data restoration device according to claim 6, wherein the clock output section adjusts cycle T or the phase based on the UP signal and the DN signal, and outputs the clock signal CKX and the clock signal CK.

9. The clock data restoration device according to claim 5, wherein the offset determination section determines the offset amount of the sampler section so that the difference between the ratio between a cumulative addition value cntINSIDE of '{D(n)^D(n−1)}*{D(n−2)^DX(n)}' and a cumulative addition value cntEDGE of 'D(n)^D(n−1)' (cntINSIDE/cntEDGE) and the value 0.5 is equal to or less than a predetermined reference value.

10. A clock data restoration device which restores a clock signal and data based on an input digital signal, comprising:

a sampler section, which receives an input of a clock signal CKX and a clock signal CK that have a same cycle T as well as the input digital signal, and which, in each nth period T(n) of the cycle T, samples and holds a value of the input digital signal at time $t_X$ indicated by the clock signal CKX at a threshold value which is offset by +Voff and −Voff, and outputs this value as DXA(n) and DXB(n) respectively, and samples, holds, and outputs the digital value D(n) of the input digital signal at a time $t_C$ indicated by the clock signal CK (where $t_X<t_C$, and n is an integer);

a detection section which receives an input of the digital value DXA(n), the digital value DXB(n), and the digital value D(n) which are output by the sampler section in each period T(n) and, in a case where digital value D(n−2) is at a high level, detects a timing relation (called a 'first timing relation' hereinbelow) between a time indicated by the clock signal CKX and a transition time of a value of a first signal (a signal obtained by applying an offset (−Voff) to the input digital signal) based on digital value D(n−1), digital value DXA(n), and digital value D(n) and, in a case where the digital value D(n−2) is at a low level, detects a timing relation (called a 'second timing relation' hereinbelow) between a time indicated by the clock signal CKX and a transition time of the value of a second signal (a signal obtained by applying an offset (+Voff) to the input digital signal) based on digital value D(n−1), digital value DXB(n), and digital value D(n), and detects a phase relation between the clock signal CK and the input digital signal based on the first timing relation and the second timing relation;

an offset determination section which determines, based on the first timing relation and the second timing relation detected by the detection section, an offset amount of the sampler section so that the time indicated by the clock signal CKX is the center of transition time distribution of the value of the first signal in a case where the digital value D(n−2) is at a high level and so that the time indicated by the clock signal CKX is the center of transition time distribution of the value of the second signal in a case where the digital value D(n−2) is at a low level; and a clock output section, which adjusts cycle T or the phase based on the phase relation detected by the detection section so that a phase difference between the clock signal CK and the input digital signal decreases, and which outputs the clock signal CKX and the clock signal CK, which satisfy relation '$t_C−t_X=T/2$', to the sampler section.

11. The clock data restoration device according to claim 10, wherein the detection section comprises:

a first timing relation detection circuit which, in cases where the digital value D(n−2) is at a high level, outputs a UPA signal which is a significant value when 'D(n−1)≠DXA(n)=D(n)', and a DNA signal which is a significant value when 'D(n−1)=DXA(n)≠D(n)', as signals which represent the first timing relation;

a second timing relation detection circuit which, in cases where the digital value D(n−2) is at a low level, outputs a UPB signal which is a significant value when 'D(n−1)≠DXB(n)=D(n)', and a DNB signal which is a significant value when 'D(n−1)=DXB(n)≠D(n)', as signals which represent the second timing relation; and a phase relation detection circuit which outputs a UP signal which represents logical OR of the UPA signal and the UPB signal, and a DN signal which represents logical OR of the DNA signal and the DNB signal, as signals which represent the phase relation.

12. The clock data restoration device according to claim 11, wherein the offset determination section determines the offset amount of the sampler section so that the difference between the ratio of a cumulative addition value cntINSIDE of 'D(n)(DNA+UPB)+D(n)(UPA+DNB)' and a cumulative addition value cntEDGE of 'UPA+UPB+DNA+DNB' (cntINSIDE/cntEDGE) and the value 0.5 is equal to or less than a predetermined reference value.

13. The clock data restoration device according to claim 10, wherein the offset determination section determines the offset amount of the sampler section so that the difference between the ratio between a cumulative addition value cntINSIDE of '{D(n)^D(n−1)}*{D(n−2)^DX(n)}' and a cumulative addition value cntEDGE of 'D(n)^D(n−1)' (cntINSIDE/cntEDGE) and the value 0.5 is equal to or less than a predetermined reference value.

14. A clock data restoration device which restores a clock signal and data based on an input digital signal, comprising:

a sampler section, which receives an input of a clock signal CKX and a clock signal CK which have a same cycle T as well as the input digital signal, generates a first signal by applying an offset (−Voff) to the input digital signal, generates a second signal by applying an offset (+Voff) to the input digital signal, and which samples, holds, and outputs, in each nth period T(n) of the cycle T, a digital value DXA(n) of the first signal and a digital value DXB(n) of the second signal at a time $t_X$ indicated by the clock signal CKX, and a digital value D(n) of the input digital signal at a time $t_C$ indicated by the clock signal CK (where $t_X<t_C$, and n is an integer);

a detection section which receives an input of the digital value DXA(n), the digital value DXB(n), and the digital value D(n) which are output by the sampler section in each period T(n), with 'DX(n)=DXA(n)' being established when a digital value D(n−2) is at a high level and with 'DX(n)=DXB(n)' being established when the digital value D(n−2) is at a low level, and detects a phase relation between the clock signal CK and input digital signal based on digital value D(n−1), digital value DX(n), and digital value D(n);

an offset determination section which determines, based on digital value DX(n), digital value D(n−2), digital value D(n−1), and digital value D(n), an offset amount of the sampler section so that a time indicated by the clock signal CKX is the center of transition time distribution of a value of the first signal in a case where the value D(n−2) is at a high level, and so that a time indicated by the clock signal CKX is the center of a transition time distribution of a value of the second signal in a case where the digital value D(n−2) is at a low level; and a clock output section, which adjusts cycle T or the phase based on the phase relation detected by the detection section so that the phase difference between the clock signal CK and the input digital signal decreases, and which outputs the clock signal CKX and the clock signal CK, which satisfy relation '$t_C−t_X=T/2$', to the sampler section.

15. The clock data restoration device according to claim 14, wherein the detection section comprises:

a selection circuit which outputs digital value DXA(n) as digital value DX(n) when digital value D(n−2) is at a high level, and outputs digital value DXB(n) as digital value DX(n) when digital value D(n−2) is at a low level; and a phase relation detection circuit which outputs a UP signal which is a significant value when 'D(n−1)≠DX(n)=D (n)' and a DN signal which is a significant value when '$D(n-1)=DX(n)\neq D(n)$', as signals which represent the phase relation.

16. The clock data restoration device according to claim 15, wherein the clock output section adjusts cycle T or the phase based on the UP signal and the DN signal, and outputs the clock signal CKX and the clock signal CK.

17. The clock data restoration device according to claim 14, wherein the offset determination section determines the offset amount of the sampler section so that the difference between the ratio between a cumulative addition value cntINSIDE of '$\{D(n)\char`\^D(n-1)\}*\{D(n-2)\char`\^DX(n)\}$' and a cumulative addition value cntEDGE of '$D(n)\char`\^D(n-1)$' (cntINSIDE/cntEDGE) and the value 0.5 is equal to or less than a predetermined reference value.

18. A clock data restoration device which restores a clock signal and data based on an input digital signal, comprising:
  a sampler section, which receives an input of a clock signal CKX and a clock signal CK which have a same cycle T as well as the input digital signal, and which, in each nth period T(n) of the cycle T, samples and holds a value of the input digital signal at time $t_X$ indicated by the clock signal CKX at a threshold value which is offset by +Voff and −Voff and outputs this value as DXA(n) and DXB(n) respectively, and samples, holds, and outputs the digital value D(n) of the input digital signal at a time $t_C$ indicated by the clock signal CK (where $t_X<t_C$, and n is an integer);
  a detection section which receives an input of the digital value DXA(n), the digital value DXB(n), and the digital value D(n) which are output by the sampler section in each period T(n), with '$DX(n)=DXA(n)$' being established when digital value D(n−2) is at a high level and with '$DX(n)=DXB(n)$' being established when digital value D(n−2) is at a low level, and detects the phase relation between the clock signal CK and input digital signal based on digital value D(n−1), digital value DX(n), and digital value D(n);
  an offset determination section which determines, based on digital value DX(n), digital value D(n−2), digital value D(n−1), and digital value D(n), an offset amount of the sampler section so that a time indicated by the clock signal CKX is the center of transition time distribution of a value of the first signal (a signal obtained by applying an offset (−Voff) to the input digital signal) in a case where the digital value D(n−2) is at a high level and so that a time indicated by the clock signal CKX is the center of transition time distribution of a value of the second signal (a signal obtained by applying an offset (+Voff) to the input digital signal) in a case where the digital value D(n−2) is at a low level; and
  a clock output section, which adjusts cycle T or the phase based on the phase relation detected by the detection section so that the phase difference between the clock signal CK and the input digital signal decreases, and which outputs the clock signal CKX and the clock signal CK, which satisfy relation '$t_C-t_X=T/2$', to the sampler section.

19. The clock data restoration device according to claim 18, wherein the detection section comprises:
  a selection circuit which outputs digital value DXA(n) as digital value DX(n) when digital value D(n−2) is at a high level and outputs digital value DXB(n) as digital value DX(n) when digital value D(n−2) is at a low level; and
  a phase relation detection circuit which outputs a UP signal which is a significant value when '$D(n-1)\neq DX(n)=D(n)$' and a DN signal which is a significant value when '$D(n-1)=DX(n)\neq D(n)$', as signals which represent the phase relation.

20. The clock data restoration device according to claim 18, wherein the offset determination section determines the offset amount of the sampler section so that the difference between the ratio between a cumulative addition value cntINSIDE of '$\{D(n)\char`\^D(n-1)\}*\{D(n-2)\char`\^DX(n)\}$' and a cumulative addition value cntEDGE of '$D(n)\char`\^D(n-1)$' (cntINSIDE/cntEDGE) and the value 0.5 is equal to or less than a predetermined reference value.

* * * * *